United States Patent
Kimura et al.

(10) Patent No.: US 8,469,859 B2
(45) Date of Patent: Jun. 25, 2013

(54) CONTROL APPARATUS FOR HYBRID VEHICLE

(75) Inventors: Hiromichi Kimura, Okazaki (JP); Tomohito Ono, Susono (JP); Yukihiko Ideshio, Susono (JP); Hirotatsu Kitabatake, Susono (JP); Hiroaki Ebuchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 94 days.

(21) Appl. No.: 13/264,011

(22) PCT Filed: Apr. 16, 2009

(86) PCT No.: PCT/JP2009/057697
§ 371 (c)(1),
(2), (4) Date: Oct. 12, 2011

(87) PCT Pub. No.: WO2010/119551
PCT Pub. Date: Oct. 21, 2010

(65) Prior Publication Data
US 2012/0028757 A1   Feb. 2, 2012

(51) Int. Cl.
B60W 10/02 (2006.01)
B60W 10/08 (2006.01)
B60W 10/04 (2006.01)
H02P 15/00 (2006.01)
F16H 3/72 (2006.01)
F16H 37/06 (2006.01)
B60K 6/442 (2007.10)
B60K 6/445 (2007.10)

(52) U.S. Cl.
USPC ......... 477/5; 477/6; 477/8; 475/8; 180/65.23; 180/65.235

(58) Field of Classification Search
USPC ................ 477/5, 6, 8; 475/1–10; 180/65.235, 180/65.23
See application file for complete search history.

(56) References Cited

U.S. PATENT DOCUMENTS
6,740,002 B1 * 5/2004 Stridsberg ....................... 477/14

FOREIGN PATENT DOCUMENTS
JP   08-183348    7/1996
JP   2006-083919  3/2006
JP   2009-001112  1/2009

OTHER PUBLICATIONS

International Search Report Issued Jul. 7, 2009 in PCT/JP09/057697 filed Apr. 16, 2009.

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

In a hybrid vehicle having a locking mechanism in which a play elimination process is required in the locking, a torque shock in the play elimination is reduced. In a hybrid vehicle 1 having a locking mechanism 700 which is a cam-lock type engaging apparatus, an ECU 100 performs MG1 locking control. In the control, play is formed between a cam 710 and a clutch plate 720 of the locking mechanism 700. The formed play is gradually reduced such that the torque shock in the play elimination does not occur due to the phase control of the cam 710, on the basis of an initial value of the amount of the play when the clutch plate 720 is bought into contact with a friction part 733 and a play elimination amount G.

8 Claims, 11 Drawing Sheets

CONTROL APPARATUS FOR HYBRID VEHICLE

TECHNICAL FIELD

The present invention relates to a control apparatus for a hybrid vehicle for controlling a hybrid vehicle which is configured to realize various power transfer aspects by locking a rotational element.

BACKGROUND ART

This type of hybrid vehicle is disclosed, for example in a patent document 1. According to the hybrid vehicle disclosed in the patent document 1, by providing a wet multiplate type brake for locking the rotation of a generator as the locking mechanism of the rotational element, it is possible to suppress the loss of the generator and to increase the efficiency of a drive apparatus.

PRIOR ART DOCUMENT

Patent Document

Patent document 1: Japanese Patent Application Laid Open No. Hei 8-183348

DISCLOSURE OF INVENTION

Subject to be Solved by the Invention

As this type of locking mechanism, instead of a locking mechanism having a relatively large amount of energy supply required to fix the rotational element such as the wet multiplate brake described in the patent document described above, it is considered to apply various meshing type engaging apparatus such as an electromagnetic dog clutch mechanism and a cam-lock mechanism.

On the other hand, in locking the rotational element by using the meshing type engaging apparatus, it is known that the locking ultimately requires so-called play elimination for eliminating or reducing play or backlash (i.e. simply, a gap) formed in the rotational direction of an engaging element coupled with the rotational element. However, as the final stage of the play elimination, with regard to a phenomenon which can be a factor that reduces drivability, durability, and reliability, such as the occurrence of a torque shock and an impulsive sound caused by a physical collision between the engaging element on the rotational element side (i.e. on the locked side) and the engaging element on the lock side, there are no effective measures taken, conventionally. In other words, in the scope of the conventional technical idea, there is such a technical problem that it is hard to efficiently lock the rotational element while preventing the reduction in drivability and reliability.

In view of the aforementioned problems, it is therefore an object of the present invention to provide a control apparatus for a hybrid vehicle capable of preventing the reduction in drivability and reliability in locking the rotational element in order to achieve various purposes.

Means for Solving the Subject

The above object of the present invention can be achieved by a control apparatus for a hybrid vehicle, the hybrid vehicle provided with: power supplying elements including at least a first electric motor, a second electric motor, and an internal combustion engine; a power transmission mechanism provided with a plurality of rotational elements which can mutually perform differential rotation and which includes a first rotational element coupled with the first electric motor, a second rotational element coupled with the second electric motor, and a third rotational element coupled with the internal combustion engine, the power transmission mechanism performing power transmission between a drive shaft coupled with an axle and the power supplying elements in accordance with a power transmission mode determined in accordance with a state of each of the plurality of rotational elements; and an engaging mechanism provided with a first engaging element coupled with a locked element as one of the plurality of rotational elements, a second engaging element which is opposed to and can engage with the first engaging element and which is coupled with a fixed element which cannot rotate or a locking element as one rotational element other than the locked element of the plurality of rotational elements, and a driving device capable of driving the first or second engaging element in a direction opposed to the second or first engaging element, respectively, the engaging mechanism capable of changing the state of the locked element between (1) a lock state in which the locked element engages with the locking element and which is realized by eliminating play formed between the first and second engaging elements in their rotational direction to bring the first and second engaging elements into contact in the rotational direction in a situation in which the first and second engaging elements are coupled with the locked element and the locking element and (2) a release state in which the locked element is released from the locking element, the control apparatus provided with: a first controlling device for controlling one power supplying element corresponding to the locked element out of the power supplying elements such that the locked element and the locking element are in a rotation synchronous state in response to a locking request to transfer the locked element to the lock state; a second controlling device for controlling the driving device such that the first or second engaging element is driven in the opposed direction to form the play if the locked element and the locking element are in the rotation synchronous state; and a third controlling device for controlling the one power supplying element such that the first engaging element rotates in a direction of eliminating the formed play in a situation in which the play is formed and such that an impulse when the first engaging element comes into contact with the second engaging element is reduced.

The hybrid vehicle of the present invention is a vehicle provided with: for example, at least the first and second electric motors each of which can be configured as an electric motor generator, such as a motor generator; and the internal combustion engine which can adopt various aspects in which there are no restrictions on a fuel type, a fuel supply aspect, a fuel combustion aspect, the structure of an intake/exhaust system, cylinder arrangement, and the like, as the power supplying elements capable of supplying the power to the drive shaft. The control apparatus for the hybrid vehicle of the present invention is an apparatus for controlling such a hybrid vehicle, and it can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands.

On the other hand, the hybrid vehicle of the present invention is provided with the power transmission mechanism having the plurality of rotational elements which mutually perform a differential action and which include the first, second, and third rotational elements coupled with the first electric motor, the second electric motor, and the internal combustion engine, respectively. Moreover, the hybrid vehicle of the present invention is an apparatus or an apparatus group for performing, due to the differential action, the power transmission between the power supplying elements and the drive shaft in accordance with various power transmission modes determined in accordance with the state of each rotational element (which is simply a physical state for defining a rotation aspect and which includes whether or not it can rotate, whether or not it is coupled with another rotational element, or the like). The transmission mechanism can adopt a gear mechanism such as one or a plurality of planetary gear mechanisms, as a preferred form. If it includes the plurality of planetary gear mechanisms, one portion of the rotational elements which constitute each planetary gear mechanism can be shared by the plurality of planetary gear mechanisms, as occasion demands.

The power transmission mechanism conceptually includes a so-called power dividing mechanism capable of dividing the power of the internal combustion engine into the first rotational element and the drive shaft (i.e. a rotational element coupled with the drive shaft) at a predetermined ratio, various reduction gear or transmission mechanisms for alternately changing the roles of the first and second electric motors between a reaction element which bears the reaction force of the internal combustion engine and an output element which supplies the power to the drive shaft, or for reducing or changing the rotational speed of the first or second electric motor. The practical aspect of the power transmission mechanism is not limited in any ways in accordance with the specification of the hybrid vehicle, a destination of the hybrid vehicle, a required performance of the hybrid vehicle, or various electrical, mechanical, or economical restrictions.

Incidentally, the "power transmission mode" is an expression including physical, mechanical, or electrical restrictions, mechanisms, or the like in the power transmission. For example, the "power transmission mode" includes in effect: a stepless speed change mode in which a transmission gear ratio as a ratio between the rotational speed of the drive shaft and the rotational speed of the internal combustion engine can be changed arbitrarily and continuously in the range of various physical, mechanical, or electrical restrictions; a fixed speed change mode in which the transmission gear ratio is fixed; various speed change modes for defining which electric motor is set as the reaction element (output element); individual transmission steps or gear stages similar to the various speed change modes; whether or not a power source is separated when an Electric Vehicle (EV) is moving; and the like.

On the other hand, the engaging mechanism of the present invention is a mechanism capable of changing the state of the locked element as one of the plurality of rotational elements provided for the power transmission mechanism between the lock state in which the locked element is fixed to the locking element and the release state in which the locked element is released from the locking element. The locking element may be the fixed element as an element which is at least in a non-rotatable state by being fixed directly or indirectly to an object which is substantially in a resting state at least with respect to the locked element, such as various cases and various bodies, or it may be one rotational element different from the locked element in the power transmission mechanism. In other words, the wording "fix" associated with the locked element means that the locked element is fixed to the locking element. If the locking element is the fixed element, the locked element is literally locked (rotationally locked). If the locking element is the rotational element, it means that the locked element rotates substantially integrally with the locking element. The engaging mechanism makes the state of the locked element variable as one of the "state of the rotational element" described above. Whether or not the locked element is locked by the engaging mechanism is related to the selection of the power transmission mode performed by the power transmission mechanism.

In other words, the engaging mechanism may be, for example, a mechanism capable of fixing the locked element to the fixed element, wherein the locked element may be the first or second rotational element coupled with the first or second electric motor, which functions as the reaction element for applying the reaction force to the internal combustion engine, or the rotational element having a differential relation with the first or second rotational element. In this case, due to the engaging mechanism, it is possible to realize so-called MG1 locking and O/D locking. By burdening this fixing device with the reaction force of the internal combustion engine, it is possible to suppress or prevent a reduction in system efficiency due to power circulation. Incidentally, a plurality of locked elements may be provided in the power transmission mechanism.

The engaging mechanism of the present invention is provided with: the first engaging element coupled with the locked element; the second engaging element coupled with the locking element; and the driving device, such as an electromagnetic actuator, capable of driving one of the engaging elements in the opposed direction (which may be namely a direction that the both engaging elements approach each other, or a direction that the both engaging elements separate from each other). Here, the wording "being coupled" does not necessarily indicate being coupled all the time, but also includes in effect being coupled selectively or limitedly if a proper condition is satisfied. In other words, the first or second engaging element may be selectively coupled with the relevant element by the application of a driving force by the driving device. Alternatively, the first or second engaging element may be coupled with an element corresponding to each of the engaging elements all the time. The former is one example of the configuration that can be preferably adopted by a cam-lock type engaging apparatus, and the latter is one example of the configuration that can be preferably adopted by an engaging apparatus such as an electromagnetic dog clutch.

Here, the engaging mechanism of the present invention is a meshing type engaging apparatus which exerts an engaging force by that the engaging elements physically mesh with each other and which requires the process of eliminating the play formed in the rotational direction of the engaging elements in the situation that the first and second engaging elements are coupled with the locked element and the locking element, respectively, in transferring the locked element to the lock state. Therefore, in comparison with a friction engaging type including a wet multiplate clutch, a wet multiplate brake, or the like, the engaging mechanism of the present invention has less energy resource for maintaining the engaging force or braking force and can maintain a higher engaging force. Thus, it is preferable as this type of engaging mechanism. On the other hand, as opposed to overall play elimination for eliminating the overall or general play of a power transmission path from the drive shaft to the output shaft of the internal combustion engine like the play elimination of an Automatic Transmission (AT) using a wet multiplate brake or the like, a torque shock and an impulsive sound can occur to no small extent when the engaging elements come into contact with each other in the rotational direction at the end of the play elimination. Thus, if no measures are taken, in exchange for the exertion of the efficient engaging force described above, it may cause a reduction in drivability or a reduction in durability or reliability due to the torque shock, the impulsive sound, or the like.

Thus, the control apparatus for the hybrid vehicle of the present invention suppresses the reduction in drivability, durability and reliability in transferring the locked element to the lock state, in the following manner.

In other words, according to the control apparatus for the hybrid vehicle of the present invention, the one power supplying element corresponding to the locked element out of the power supplying elements is firstly controlled by the first controlling device such that the locked element and the locking element are in the rotation synchronous state in response to the locking request to transfer the locked element to the lock state. Here, the "rotation synchronous state" indicates a state in which a relative rotational speed between the locked element and the locking element converges within an allowable value which can be determined in accordance with the configuration of the engaging mechanism or on the basis of experiments, experiences, theories, simulations, or the like in advance, and preferably, it indicates a state in which the relative rotational speed converges on extremely low rotation at zero or near zero. Moreover, the "one power supplying element corresponding to the locked element" means a power supplying element which can control the rotational speed of the locked element to be a desired rotational speed, and desirably, it means a power supplying element which has no influence on the power supplied to the drive shaft or which has a relatively small influence on the power supplied to the drive shaft, or a power supplying element which can change the rotational speed of the locked element most efficiently and which is coupled with, for example, the locked element.

On the other hand, if the states of the locked element and the locking element transfer to the rotational synchronous state described above in response to the locking request, the driving device is controlled by the second controlling device and the first or second engaging element is driven in the opposed direction, by which the play is formed between the engaging elements. Incidentally, for example, in the case of a cam-lock type engaging apparatus, this type of operation of the second controlling device can correspond to an operation of absorbing a clutch element opposed to a cam in a direction of a friction element, which is located in a direction that it separates from the cam (i.e. in this case, the locked element and the locking element are set to be in the rotation synchronous state in the situation that the second engaging element is not fixed to the locking element) or similar operations. In the case of an electromagnetic dog clutch apparatus, the operation of the second controlling device can correspond to an operation of bringing clutch plates on which dog teeth are formed, close to each other (e.g. an operation of bringing them in contact in the opposed direction, or minimizing a gap in the opposed direction) or similar operations.

As described above, if the play is formed, the aforementioned one power source is controlled by the third controlling device, and the first engaging element (i.e. uniquely meaning the locked element) is rotationally driven in the direction of eliminating the play (hereinafter referred to as a "play eliminating direction" as occasion demands). Here, in particular, when the locked element is rotationally driven in the play eliminating direction, the third controlling device controls the power supplying element such that the impulse when the first engaging element comes into contact with the second engaging element is reduced.

Here, whether or not the impulse is reduced can seemingly require the reference value of an impulsive force which is absolute or which is practical at a driver's recognition level; however, actually, such an absolute reference value is not necessarily required in the control performed such that "the impulse is reduced" in the present invention. In other words, the technical idea associated with the operations of the third controlling device includes a technical idea premised on the absolute value of the impulsive force and includes a broader technical idea. In other words, before giving thought to an influence of the impulse in the play elimination on drivability, durability or reliability, no matter how the play elimination is performed, as long as there is no guide or guideline that correlates with this type of influence, it is almost impossible to permanently keep avoiding the impulse at the level that can cause the reduction in drivability, durability, and reliability, even if there is a case where the impulse is reduced accidentally. On the other hand, the control apparatus for the hybrid vehicle of the present invention is provided by taking into account the point that the influence of the impulse can be reduced to the level that there is practically no influence by controlling the behavior of the first engaging element in the process of eliminating the play. The control apparatus for the hybrid vehicle of the present invention can reduce the impulse, not accidentally but intentionally, under various control conditions determined to maintain, for example, the drivability including the comfort of passengers including a driver and a passenger from an ergonomic viewpoint, the reliability, and the durability of the drive shaft or the engaging mechanism, at the level that there is practically no problem, on the basis of experiments, experiences, theories, simulations, or the like in advance. Therefore, it is possible to reduce the impulse due to the play elimination in the range of not hindering the realization of the power transmission mode aimed by the locking request, and of course, it is possible to preferably maintain the drivability, the durability, and the reliability while maintaining an efficient effect.

In one aspect of the control apparatus for the hybrid vehicle of the present invention, the engaging mechanism is configured to change a speed change mode for defining a transmission gear ratio, which is a ratio between a rotational speed of the drive shaft and a rotational speed of the internal combustion engine, between a stepless speed change mode in which the transmission gear ratio corresponding to a case where the locked element is in the release state is continuously variable and a fixed speed change mode in which the transmission gear ratio corresponding to a case where the locked element is in the lock state is fixed.

According to this aspect, if the locked element is in the release state in which the locked element is released from the locking element and it can rotate, it is possible to realize the stepless speed change mode in which the aforementioned transmission gear ratio can be changed, continuously (including a stepwise aspect as well as being practically continuously) in the range of physical, mechanical, mechanistic, or electrical restrictions defined in advance, substantially, or theoretically. In this case, as a preferred form, by controlling the rotational speed of the first or second electric motor as the reaction element, the operating point of the internal combustion engine (e.g. a point which is defined by an engine rotational speed and a torque and which is to define one operating condition of the internal combustion engine) is arbitrarily selected theoretically, substantially, or in the range of some restriction. For example, it is controlled to be an optimal fuel economy operating point at which a fuel consumption rate is minimized theoretically, substantially, or in the range of some restriction, or an optimal fuel economy operating point at which the system efficiency of the hybrid vehicle (e.g. an overall efficiency calculated on the basis of the transmission efficiency of the power transmission mechanism and the thermal efficiency of the internal combustion engine or the like) is maximized theoretically, substantially, or in the range of some restriction.

On the other hand, in the fixed speed change mode corresponding to the lock state in which the locked element is fixed to the locking element, the aforementioned transmission gear ratio is fixed to one value. For example, it is assumed that the differential aspect of each rotational element is defined such that if the rotational speeds of two elements or two element groups out of three types of rotational elements or rotational element groups are determined, then, the rotational speed of the remaining one rotational element or one rotational element group is inevitably determined, wherein the three types of rotational elements or rotational element groups are the rotational element or rotational element group coupled with the internal combustion engine, the rotational element or rotational element group coupled with the first electric motor, and the rotational element or rotational element group coupled with the second electric motor in the power transmission mechanism. In this case, if the locked element is in the lock state, the engine rotational speed of the internal combustion engine can be uniquely defined by the rotation of the rotational element on the drive shaft side limited by a vehicle speed. Thus, this type of fixed speed change mode can be preferably realized. At this time, since it is possible to burden the locking element with the reaction force in the fixed speed change mode, the electric motor as the reaction element is not required. Thus, it is possible to avoid the generation of a wasteful electrical path referred to so-called power circulation, and it is possible to drive the hybrid vehicle, more efficiently.

In another aspect of the control apparatus for the hybrid vehicle of the present invention, the third controlling device controls a rotational speed of the one power supplying element in accordance with a remaining amount of the formed play.

According to this aspect, the rotational speed of the power supplying element is controlled in accordance with the remaining amount of the play. A reduction in the rotational speed can reduce the impulse in the completion of the play elimination. Thus, the rotational speed is practically useful as a control target associated with the reduction in the impulse. Further to that, the play formed in the engaging mechanism of the present invention is different from play defined on the power transmission path which is relatively long and which is located in a wet multiplate engaging apparatus or the like. It is a gap mechanically generated mainly between the first and second engaging elements, and additionally between the power supplying elements coupled with the engaging elements. It is possible to know the amount of the formed play in advance and to know its remaining amount during the control, relatively easily. According to this aspect, by using the matters specializing in the present invention, it is possible to eliminate the play while reducing the impulse, quickly and accurately, and in accordance with desired play elimination characteristics, which is remarkably effective.

Incidentally, in this aspect, the third controlling device may control the rotational speed of the one power supplying element such that a relative rotational speed between the first engaging element and the second engaging element is reduced in accordance with a reduction in the remaining amount.

As described above, if the relative rotational speed between the engaging elements is reduced, in a binary, stepwise, or continuous manner in accordance with the reduction in the remaining amount of the play, it is possible to reduce the impulse in the play elimination while reducing a time required for the play elimination. Thus, it is extremely useful in actually operating the vehicle.

Moreover, in this aspect, the engaging mechanism may be a cam-lock mechanism which includes: a cam as the first engaging element; a clutch element as the second engaging element which is opposed to the cam in a situation in which a predetermined power transmission member is laid between the clutch plate and the cam and which is separated from the locking element in an initial state; and an actuator as the driving device capable of applying to the clutch element a driving force for fixing the clutch element to the locking element, and in which the play corresponding to a movable range of the power transmission member is formed in the rotational direction by that the clutch element is fixed to the locking element in the rotation synchronous state, and the third controlling device may control the rotational speed of the one power supplying element by using an amount of the play at a time at which the clutch element is fixed to the locking element as a reference value of the remaining amount.

In the cam-lock type engaging mechanism, if the locked element is in the release state, the first and second engaging elements rotate substantially integrally, and the locked element is in the rotation synchronous state together with the locking element, and the amount of the play when the second engaging element is fixed to the locking element regardless of directly or indirectly by being driven toward the locking element (i.e. in the opposed direction) by the actuator is almost equal in practice every time. Thus, on the basis of the play at this time point, in this type of cam-lock type engaging mechanism, the remaining amount of the play can be accurately known by performing a time process (integral process) on the rotational speed of the power supplying element (uniquely corresponding to the rotational speed of the first engaging element).

In another aspect of the control apparatus for the hybrid vehicle of the present invention, the third controlling device controls a phase of the one power supplying element in accordance with a remaining amount of the formed play.

According to this aspect, the phase of the power supplying element is controlled in accordance with the remaining amount of the play. The phase uniquely means the angle of rotation and the amount of the play, and it is effective as in the aforementioned rotational speed as an index value for reducing the impulse in the completion of the play elimination. Incidentally, if a control concept using the rotational speed is cooperated with a control concept using this phase, so-called phase synchronous control can be also realized. The phase synchronous control is performed such that the relative rotational speed between the first and second engaging elements converges on substantially zero at a time at which a relative rotational phase between the first and second engaging elements becomes zero. Although it requires an operation of constantly repeating the specification of a change in the phase by the time process (integral process) of the rotational speed and feedback to a target rotational speed, the phase synchronous control is excellent in any of its accuracy, swiftness, and impulse reduction characteristic.

Incidentally, in this aspect, the engaging mechanism may be a cam-lock mechanism which includes: a cam as the first engaging element; a clutch element as the second engaging element which is opposed to the cam in a situation in which a predetermined power transmission member is laid between the clutch plate and the cam and which is separated from the locking element in an initial state; and an actuator as the driving device capable of applying to the clutch element a driving force for fixing the clutch element to the locking element, and in which the play corresponding to a movable range of the power transmission member is formed in the rotational direction by that the clutch element is fixed to the locking element in the rotation synchronous state, and the third controlling device may control the phase of the one power supplying element by using an amount of the play at a time at which the clutch element is fixed to the locking element as a reference value of the remaining amount.

In this case, as in the case where the rotational speed is used as a control index value, it is possible to accurately determine the base point of the play elimination process.

In another aspect of the control apparatus for the hybrid vehicle of the present invention, it is further provided with: a specifying device for specifying a driver request torque as the power to be outputted to the drive shaft; and a fourth controlling device for controlling the power supplying elements such that a torque as the power supplied to the drive shaft at a time at which the locked element transfers from the release state to the lock state is not separated with respect to the specified driver request torque.

Depending on the configuration of the power transmission mechanism, in some cases, a drive torque supplied to the drive shaft separates from the driver request torque when the locked element transfers from the release state to the lock state, due to a difference in the gear ratio between the rotational elements. Moreover, in the configuration of calculating of a direct torque supplied from the internal combustion engine to the drive shaft on the basis of the reaction torque of the first or second electric motor which is the reaction element, if the reaction element is changed to the fixed element by the locking mechanism in realizing the aforementioned fixed speed change mode, then, the calculation of the direct torque is not possible, and it will likely cause problems in making the driver request torque to be supplied to the drive shaft follow the output torque of the internal combustion engine.

According to this aspect, in order that the driver request torque specified on the basis of, for example, an accelerator opening degree, a vehicle speed, or the like by the specifying device does not separate from the drive torque as the power supplied from the power supplying element to the drive shaft, the power supplying element is controlled by the fourth controlling device. Thus, it is possible to preferably avoid the influence of the change in the state of the locked element on the direct torque of the internal combustion engine, and it is possible to preferably suppress the reduction in drivability caused by the torque shock.

The operation and other advantages of the present invention will become more apparent from the embodiments explained below.

BEST MODE FOR CARRYING OUT THE INVENTION

Embodiments of the Invention

Hereinafter, various preferred embodiments of the present invention will be explained with reference to the drawings.

First Embodiment

<1-1: Structure of Embodiment>

Figure 1:
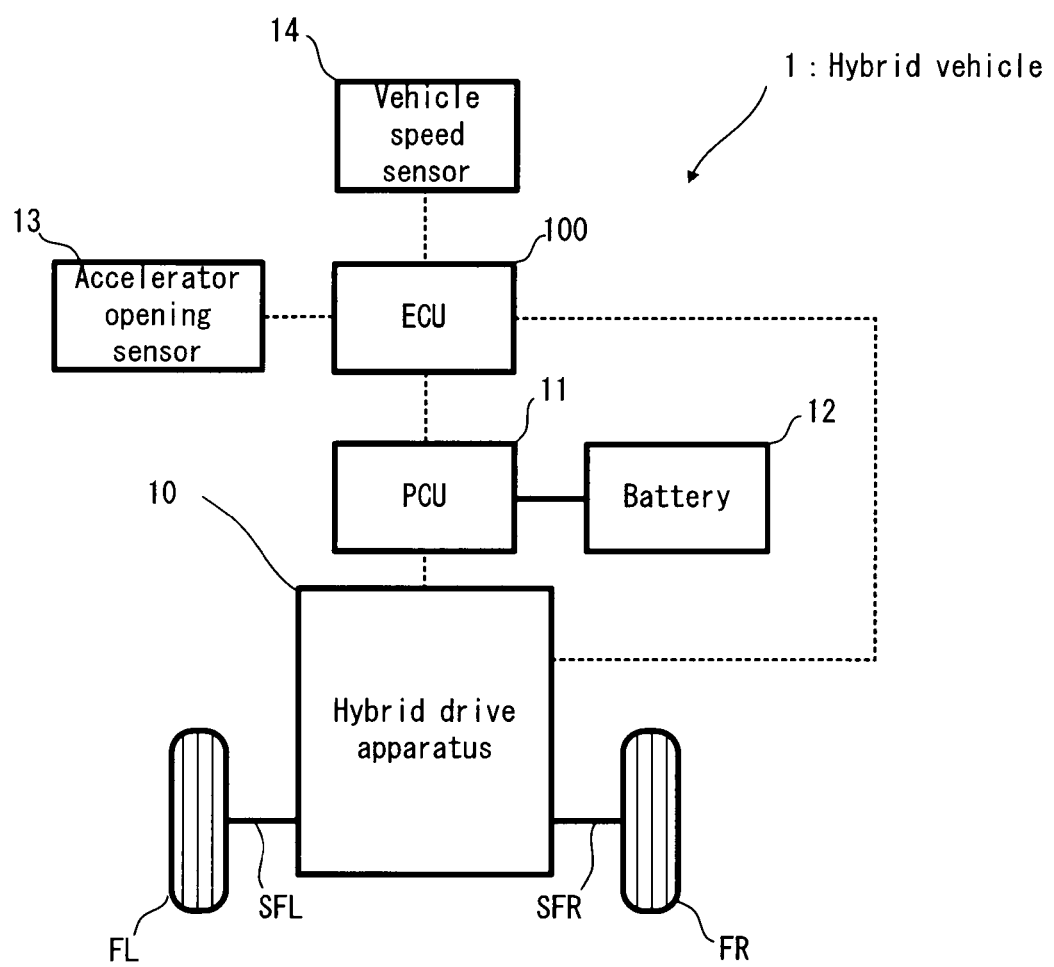
FIG. 1 is a schematic configuration diagram conceptually showing the structure of a hybrid vehicle in a first embodiment of the present invention.

Firstly, with reference to FIG. 1, an explanation will be given on the structure of a hybrid vehicle 1 in a first embodiment of the present invention. FIG. 1 is a schematic configuration diagram conceptually showing the structure of the hybrid vehicle 1.

In FIG. 1, the hybrid vehicle 1 is provided with: a hybrid drive apparatus 10; a Power Control Unit (PCU) 11; a battery 12; an accelerator opening sensor 13; a vehicle speed sensor 14; and an ECU 100. The hybrid vehicle 1 is one example of the "hybrid vehicle" of the present invention.

The ECU 100 is provided with a CPU, a ROM) a RAM and the like. The ECU 100 is an electronic control unit capable of controlling the operations of each part of the hybrid vehicle 1. The ECU 100 is one example of the "control apparatus for the hybrid vehicle" of the present invention. The ECU 100 can perform MG1 locking control described later, in accordance with a control program stored in the ROM. Incidentally, the ECU 100 is a unified or one-body electronic control unit configured to function as one example of each of the "first controlling device", the "second controlling device", the "third controlling device", the "specifying device", and the "fourth controlling device", and all the operations of the respective devices are performed by the ECU 100. However, the physical, mechanical and electrical configurations of each of the aforementioned devices of the present invention are not limited to this. For example, each of the devices may be configured as various computer systems such as a plurality of ECUs, various processing units, various controllers or microcomputer apparatuses.

The PCU 11 includes a not-illustrated inverter which can convert direct-current (DC) power extracted from the battery 12 to alternating-current (AC) power and supply it to a motor generator MG1 and a motor generator MG2 described later and which can convert AC power generated by the motor generator MG1 and the motor generator MG2 to DC power and supply it to the battery 12. The PCU 11 is a power control unit capable of controlling the input/output of the electric power between the battery 12 and each motor generator, or the input/output of the electric power between the motor generators (i.e. in this case, the electric power is transferred between the motor generators without via the battery 12). The PCU 11 is electrically connected to the ECU 100, and the operations of the PCU 11 are controlled by the ECU 100.

The battery 12 is a chargeable storage battery device which functions as an electric power source associated with the electric power for the power running of the motor generator MG 1 and the motor generator MG2.

The accelerator opening sensor 13 is a sensor capable of detecting an accelerator opening degree Ta which is the operation amount of a not-illustrated accelerator pedal of the hybrid vehicle 1. The accelerator opening sensor 13 is electrically connected to the ECU 100, and the detected accelerator opening degree Ta is referred to by the ECU 100 with a constant or irregular period.

The vehicle speed sensor 14 is a sensor capable of detecting a vehicle speed V of the hybrid vehicle 1. The vehicle speed sensor 14 is electrically connected to the ECU 100, and the detected vehicle speed V is referred to by the ECU 100 with a constant or irregular period.

Figure 2:
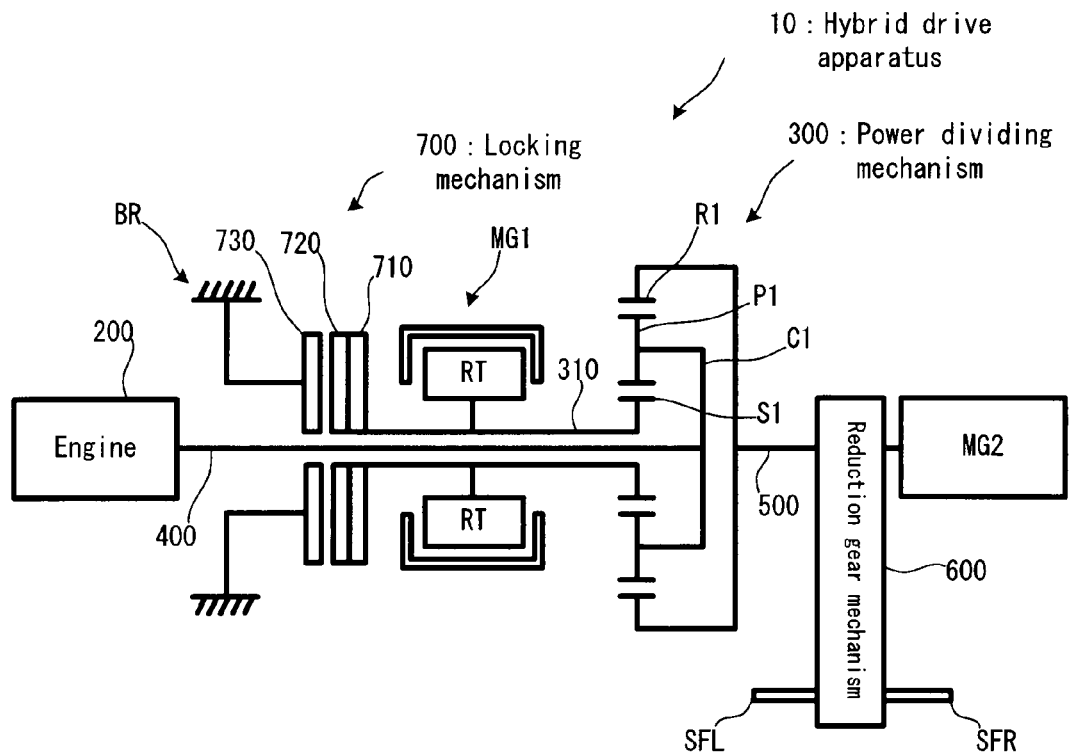
FIG. 2 is a schematic configuration diagram conceptually showing the structure of a hybrid drive apparatus in the hybrid vehicle in FIG. 1.

The hybrid drive apparatus 10 is a power unit which functions as a power train of the hybrid vehicle 1. Now, with reference to FIG. 2, the detailed structure of the hybrid drive apparatus 10 will be explained. FIG. 2 is a schematic configuration diagram conceptually showing the structure of the hybrid drive apparatus 10. Incidentally, in FIG. 2, portions overlapping those of FIG. 1 will carry the same reference numerals, and the explanation thereof will be omitted as occasion demands.

In FIG. 2, the hybrid drive apparatus 10 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), an input shaft 400, a drive shaft 500, a reduction gear mechanism 600 and a locking mechanism 700.

Figure 3:
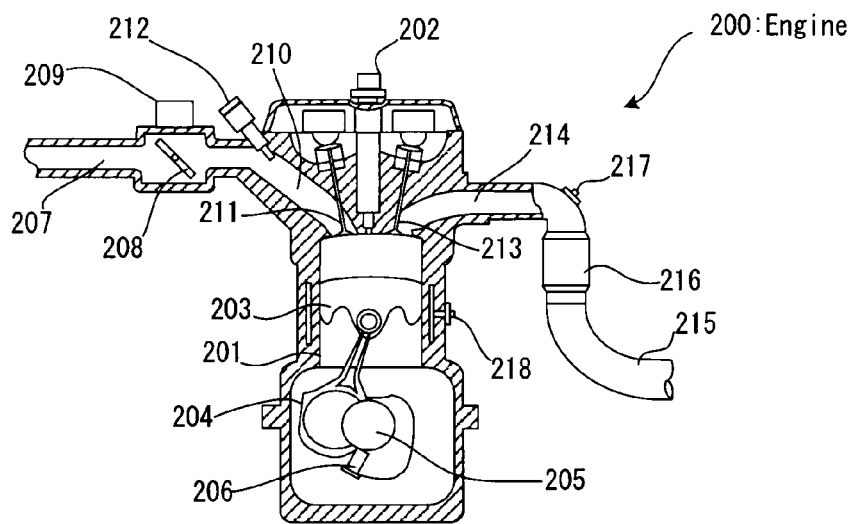
FIG. 3 is a schematic diagram showing one cross-sectional structure of an engine provided for the hybrid drive apparatus in FIG. 2.

The engine 200 is a gasoline engine as one example of the "internal combustion engine" of the present invention, and it functions as a main power source of the hybrid vehicle 1. Now, with reference to FIG. 3, the detailed structure of the engine 200 will be explained. FIG. 3 is a schematic diagram showing one cross-sectional structure of the engine 200. Incidentally, in FIG. 3, portions overlapping those of FIG. 1 and FIG. 2 will carry the same reference numerals, and the explanation thereof will be omitted as occasion demands. Incidentally, the "internal combustion engine" of the present invention includes, for example, a two-cycle or four-cycle reciprocating engine or the like and conceptually includes an engine configured to have at least one cylinder and to extract a force generated when an air-fuel mixture including various fuels such as gasoline, light oil or alcohol is burned in a combustion chamber within the cylinder, as a driving force via a physical or mechanical transmitting device such as a piston, a connecting rod, and a crankshaft, as occasion demands. As long as the concept is satisfied, the structure of the internal combustion engine of the present invention is not limited to that of the engine 200 but may have various aspects. Incidentally, the engine 200 is an in-line four-cylinder engine in which four cylinders 201 are aligned in a direction perpendicular to the plane of the paper. Since the structures of the individual cylinders 201 are equal to each other, only one cylinder 201 will be explained in FIG. 3.

In FIG. 3, the engine 200 is configured to burn the air-fuel mixture through an ignition operation performed by an ignition apparatus 202 in which one portion of an ignition plug or spark plug (whose reference numeral is omitted) is exposed to the combustion chamber in the cylinder 201. At the same time, the engine 200 is configured to convert reciprocating motion of a piston 203 generated in accordance with an explosive power caused by the combustion, to rotational motion of a crankshaft 205 as the "engine output shaft" of the present invention, via a connecting rod 204.

In the vicinity of the crankshaft 205, a crank position sensor 206 for detecting the rotational position of the crankshaft 205 (i.e. a crank angle) is placed. The crank position sensor 206 is electrically connected to the ECU 100 (not illustrated). In the ECU 100, an engine rotational speed NE of the engine 200 is calculated on the basis of a crank angle signal outputted from the crank position sensor 206.

In the engine 200, the air sucked from the exterior is supplied through an intake tube 207 and an intake port 210 to the inside of the cylinder 201 in the opening of an intake valve 211. On the other hand, a fuel injection valve of an injector 212 is exposed in the intake port 210, and it is configured to inject or spray the fuel to the intake port 210. The fuel injected or sprayed from the injector 212 is mixed with the intake air before or after the valve opening timing of the intake valve 211, to thereby make the aforementioned air-fuel mixture.

The fuel is stored in a not-illustrated fuel tank and is supplied to the injector 212 through a not-illustrated delivery pipe by the action of a not-illustrated feed pump. The air-fuel mixture burned in the cylinder 201 becomes an exhaust gas and is supplied to an exhaust tube 215 through an exhaust port 214 in the opening of an exhaust valve 213 which opens or closes in conjunction with the opening or closing of the intake valve 211.

On the other hand, on the upstream side of the intake port 210 in the intake tube 207, there is disposed a throttle valve 208 capable of adjusting an intake air amount associated with the intake air supplied through a not-illustrated cleaner. The throttle valve 208 is configured such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (i.e. the aforementioned accelerator opening degree Ta); however, it can also adjust the throttle opening degree without a driver's will through the operation control of the throttle valve motor 209. In other words, the throttle valve 208 is configured as a kind of electronically-controlled throttle valve.

In the exhaust tube 215, a ternary or three-way catalyst 216 is placed. The ternary catalyst 216 is a catalyst apparatus configured to reduce NOx (nitrogen oxide) in an exhaust air emitted from the engine 200 and to oxidize CO (carbon monoxide) and HC (hydrocarbon) in the exhaust air. Incidentally, a form that can be adopted by the catalyst apparatus is not limited to such a ternary catalyst. For example, instead of or in addition to the ternary catalyst, various catalysts such as a NSR catalyst (or NOx storage-reduction catalyst) or an oxidation catalyst may be placed.

In the exhaust tube 215, there is placed an air-fuel ratio sensor 217 capable of detecting the exhaust air-fuel ratio of the engine 200. Moreover, in a water jacket placed in a cylinder block for accommodating the cylinder 201, a water temperature sensor 218 is disposed in order to detect a coolant temperature associated with a coolant or cooling water (LLC) circulated and supplied to cool the engine 200. Each of the air-fuel ratio sensor 217 and the water temperature sensor 218 is electrically connected to the ECU 100, and the detected air-fuel ratio and the detected coolant temperature are grasped or confirmed by the ECU 100 with a constant or irregular detection period.

Back in FIG. 2, the motor generator MG1 is an electric motor generator as one example of the "first electric motor" of the present invention. The motor generator MG1 is provided with: a power running function for converting electrical energy into kinetic energy; and a regeneration function for converting the kinetic energy into the electrical energy. The motor generator MG2 is an electric motor generator as one example of the "second electric motor" of the present invention. As in the motor generator MG1, the motor generator MG2 is provided with: the power running function for converting the electrical energy into the kinetic energy; and the regeneration function for converting the kinetic energy into the electrical energy. Incidentally, each of the motor generators MG1 and MG2 is configured as, for example a synchronous electric motor generator, and it is provided with: a rotor having a plurality of permanent magnets on the outer circumferential surface; and a stator around which a three-phase coil for forming a rotating magnetic field is formed; however, it may have another configuration.

The power dividing mechanism 300 is a power transmitting apparatus as one example of the "power transmission mechanism" of the present invention, provided with: a sun gear S1 as one example of the "first rotational element" of the present invention, disposed in the central part; a ring gear R1 as one example of the "second rotational element" of the present invention, concentrically disposed on the outer circumference of the sun gear S1; a plurality of pinion gears P1, each of which is disposed between the sun gear S1 and the ring gear R1 and each of which revolves around the sun gear S1 on the outer circumference of the sun gear S1 while rotating on its axis; and a carrier C1 as one example of the "third rotational element" of the present invention, for supporting the rotating shaft of each pinion gear.

Here, the sun gear S1 is coupled with a rotor RT of the MG1 via a sun gear shaft 310, and its rotational speed is equivalent to the rotational speed of the MG1 (hereinafter referred to as a "MG1 rotational speed Nmg1" as occasion demands). Moreover, the ring gear R1 is connected to a not-illustrated rotor of the MG2 via the drive shaft 500 and the reduction gear mechanism 600, and its rotational speed is equivalent to the rotational speed of the MG2 (hereinafter referred to as a "MG2 rotational speed Nmg2" as occasion demands). Moreover, the carrier C1 is coupled with the input shaft 400 coupled with the aforementioned crankshaft 205 of the engine 200, and its rotational speed is equivalent to the engine rotational speed NE of the engine 200. Incidentally, in the hybrid drive apparatus 10, each of the MG1 rotational speed Nmg1 and the MG2 rotational speed Nmg2 is detected with a constant period by a rotation sensor such as a resolver and is transmitted to the ECU 100 with a constant or irregular period.

On the other hand, the drive shaft 500 is coupled with drive shafts SFR and SFL (i.e. those drive shafts are one example of the "axle" of the present invention) for driving a right front wheel FR and a left front wheel FL, respectively, which are the drive wheels of the hybrid vehicle 1, via the reduction gear mechanism 600 including various reduction gears such as a differential. Therefore, a motor torque Tmg2 supplied from the motor generator MG2 to the drive shaft 500 (i.e. one example of the "power" of the present invention) is transmitted to each drive shaft via the reduction gear mechanism 600, and a driving force from each drive wheel transmitted via each drive shaft is inputted to the motor generator MG2 via the reduction gear mechanism 600 and the drive shaft 500 in the same manner. In other words, the MG2 rotational speed Nmg2 has a unique relation with the vehicle speed V of the hybrid vehicle 1.

The power dividing mechanism 300 can divide an engine torque Te supplied to the input shaft 400 via the crankshaft 205 from the engine 200 under the aforementioned configuration, into the sun gear S1 and the ring gear R1 at a predetermined ratio (a ratio corresponding to a gear ratio between the gears) by using the carrier C1 and the pinion gears P1, and it can divide the power of the engine 200 into two systems.

In order to make it easier to understand the operations of the power dividing mechanism 300, a gear ratio ρ is defined as the number of the teeth of the sun gear S1 with respect to the number of the teeth of the ring gear R1. In the action of the engine torque Te on the carrier C1 from the engine 200, a torque Tes which appears on the sun gear shaft 310 is expressed by the following equation (1), and a torque Ter which appears on the drive shaft 500 is expressed by the following equation (2).

$$Tes = -Te \times \rho/(1+\rho) \quad (1)$$

$$Ter = Te \times 1/(1+\rho) \quad (2)$$

Incidentally, the configuration in the embodiment of the "power dividing mechanism" of the present invention is not limited to that of the power dividing mechanism 300. For example, the power dividing mechanism of the present invention may be provided with a plurality of planetary gear mechanisms, wherein each of the plurality of rotational elements provided for one planetary gear mechanism is coupled with respective one of the plurality of rotational elements provided for another planetary gear mechanism as occasion demands to form a unified or one-body differential mechanism. Moreover, the reduction gear mechanism 600 in the embodiment merely reduces the rotational speed of the drive shaft 500 in accordance with a reduction gear ratio set in advance; however, apart from this type of reduction gear apparatus, the hybrid vehicle 1 may be provided with a step transmission provided with a plurality of transmission steps or gear stages having a plurality of clutch mechanisms and a brake mechanism as its components. For example, there may be provided a planetary gear mechanism equivalent to the power dividing mechanism 300 between the motor generator MG2 and the reduction gear mechanism 600. The rotor of the MG2 may be coupled with the sun gear of the planetary gear mechanism, and the ring gear R1 may be coupled with the ring gear of the planetary gear mechanism. At the same time, the carrier may be fixed in a non-rotatable manner. By these, the MG2 rotational speed Nmg2 may be reduced.

The locking mechanism 700 includes a cam 710, a clutch plate 720, and an actuator 730 as its main components, and it is configured to selectively change the state of the sun gear S1 between a lock state in which the sun gear S1 cannot rotate and a release state in which the sun gear S1 can rotate. The locking mechanism 700 is a cam-lock type engaging apparatus as one example of the "locking device" of the present invention. In other words, the sun gear S1 is one example of the "locked element" of the present invention.

Figure 4:
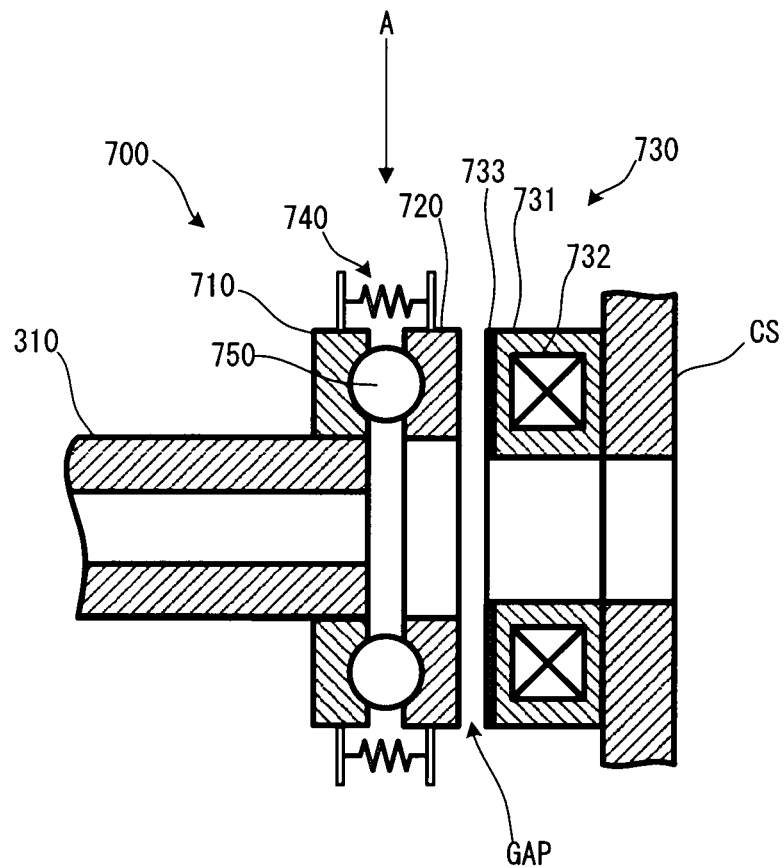
FIG. 4 is a schematic diagram showing one cross-sectional structure of a locking mechanism provided for the hybrid drive apparatus in FIG. 2.

Now, with reference to FIG. 4, the detailed structure of the locking mechanism 700 will be explained. FIG. 4 is a schematic cross sectional view showing one cross-sectional structure of the locking mechanism 700. Incidentally, in FIG. 4, portions overlapping those of FIG. 2 will carry the same reference numerals, and the explanation thereof will be omitted as occasion demands.

In FIG. 4, the locking mechanism 700 is provided with a cam 710, a clutch plate 720, an actuator 730, a return spring 740 and a cam ball 750.

The cam 710 is a substantially disk-shaped engaging member as one example of the "first engaging member" of the present invention, which is coupled with the sun gear shaft 310, which can rotate integrally with the sun gear shaft 310, and which makes a pair with the clutch plate 720. The cam 710 is one example of the "cam" of the present invention. Incidentally, the cam 710 is not necessarily directly coupled with the sun gear 310, and it may be indirectly coupled with the sun gear 310 via various coupling members.

The clutch plate 720 is a disk-shaped engaging member as one example of the "second engaging member" of the present invention, which is made of a magnetic metal material, which is placed opposite to the cam 710, and which makes a pair with the cam 710.

The actuator 730 is one example of the "driving device" and the "actuator" of the present invention, including a suction part 731, an electromagnet 732 and a friction part 733.

The suction part 731 is the housing or package of the actuator 730 which is made of a magnetic metal member and which can accommodate the electromagnet 732. The suction part 731 is fixed to a case CS as one example of the "fixed element" of the present invention which is substantially integrally fixed with the outer member of the hybrid drive apparatus 10. In other words, the suction part 731 functions as one example of the "locking element" of the present invention together with the case CS.

The electromagnet 732 is a magnet capable of generating a magnetic force in an excitation state in which a predetermined excitation current is supplied from a not-illustrated drive part receiving electric power supply from the battery 12. The magnetic force generated from the electromagnet 732 in the excitation state draws the aforementioned clutch plate 720 via the suction part 731 made of the magnetic metal material (i.e. applies an electromagnetic force as a driving force to the clutch plate 720 in a direction of drawing the clutch plate 720). Incidentally, this drive part is electrically connected to the ECU 100, and the excitation operation of the electromagnet 732 is superior controlled by the ECU 100.

The friction part 733 is a friction functional body formed on the opposed surface of the clutch plate 720 in the suction part 731. The frictional coefficient of the friction part 733 is set to block the displacement of an object in a contact state more greatly than when the friction part 733 is not formed.

The return spring 740 is an elastic body which is fixed to the clutch 720 at one fixed edge and the cam 710 at the other fixed edge. The return spring 740 biases or applies an electric force to the clutch plate 720 in the direction of the cam 710. Thus, the clutch plate 720 is normally stopped at a non-contact position across a predetermined opposed interval GAP from the suction part 731 in response to the biasing of the return spring 740.

The cam ball 750 is a spherical object as one example of the "power transmission member" of the present invention laid between the cam 710 and the clutch plate 720. In the locking mechanism 700, a torque Tmg1 of the motor generator MG1 transmitted to the cam 710 via the sun gear S1 and the sun gear shaft 310 is transmitted to the clutch plate 720, with the cam ball 750 as a transmission element.

Figure 5:
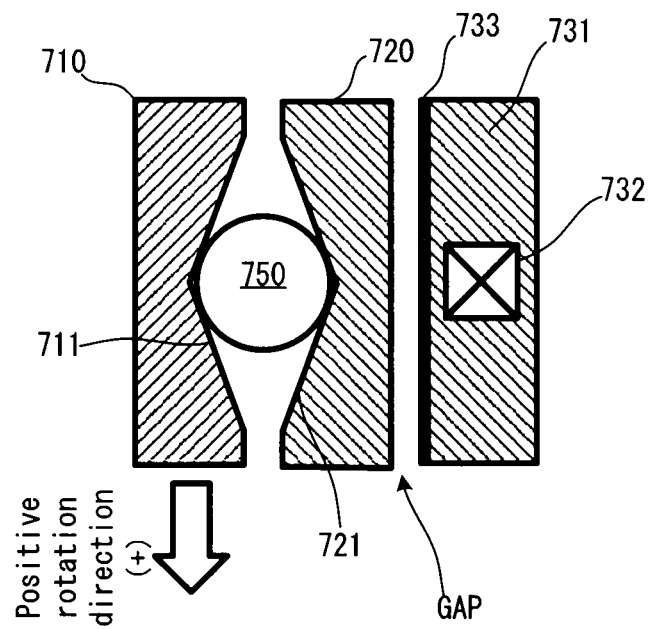
FIG. 5 is a schematic diagram showing one cross-sectional structure of the locking mechanism viewed in an arrow A direction in FIG. 4.

Now, with reference to FIG. 5, the structure of the locking mechanism 700 will be explained, more specifically. FIG. 5 is a schematic cross sectional view showing the locking mechanism 700 viewed in an arrow A direction in FIG. 4. Incidentally, in FIG. 5, portions overlapping those of FIG. 4 will carry the same reference numerals, and the explanation thereof will be omitted as occasion demands.

In FIG. 5, the opposed surface of each of the cam 710 and the clutch plate 720 is formed such that the thickness of the opposed surface in the extending direction of the sun gear shaft 310 becomes smaller as it goes toward its central portion. The cam ball 750 is held near the central portion in which the cam 710 and the clutch plate 720 have the largest opposed space. Thus, if the clutch plate 720 is at the aforementioned non-contact position, the cam 710 and the clutch plate 720 rotate substantially integrally in a direction equal to the rotational direction of the motor generator MG1, with the cam ball 750 as a torque transmission element. Therefore, if the clutch plate 720 is at the aforementioned non-contact position, the rotation of the motor generator MG1 is not blocked at all, at least in practice. Incidentally, in FIG. 5, a downward direction is defined as the positive rotational direction of the motor generator MG1. The motor generator MG1 can rotate not only in the positive rotational direction but also in a negative rotational direction (illustration is omitted) precisely opposite to the positive rotational direction.

<1-2: Operation of Embodiment>
<1-2-1: Locking Action of Locking Mechanism 700>

Figure 6:
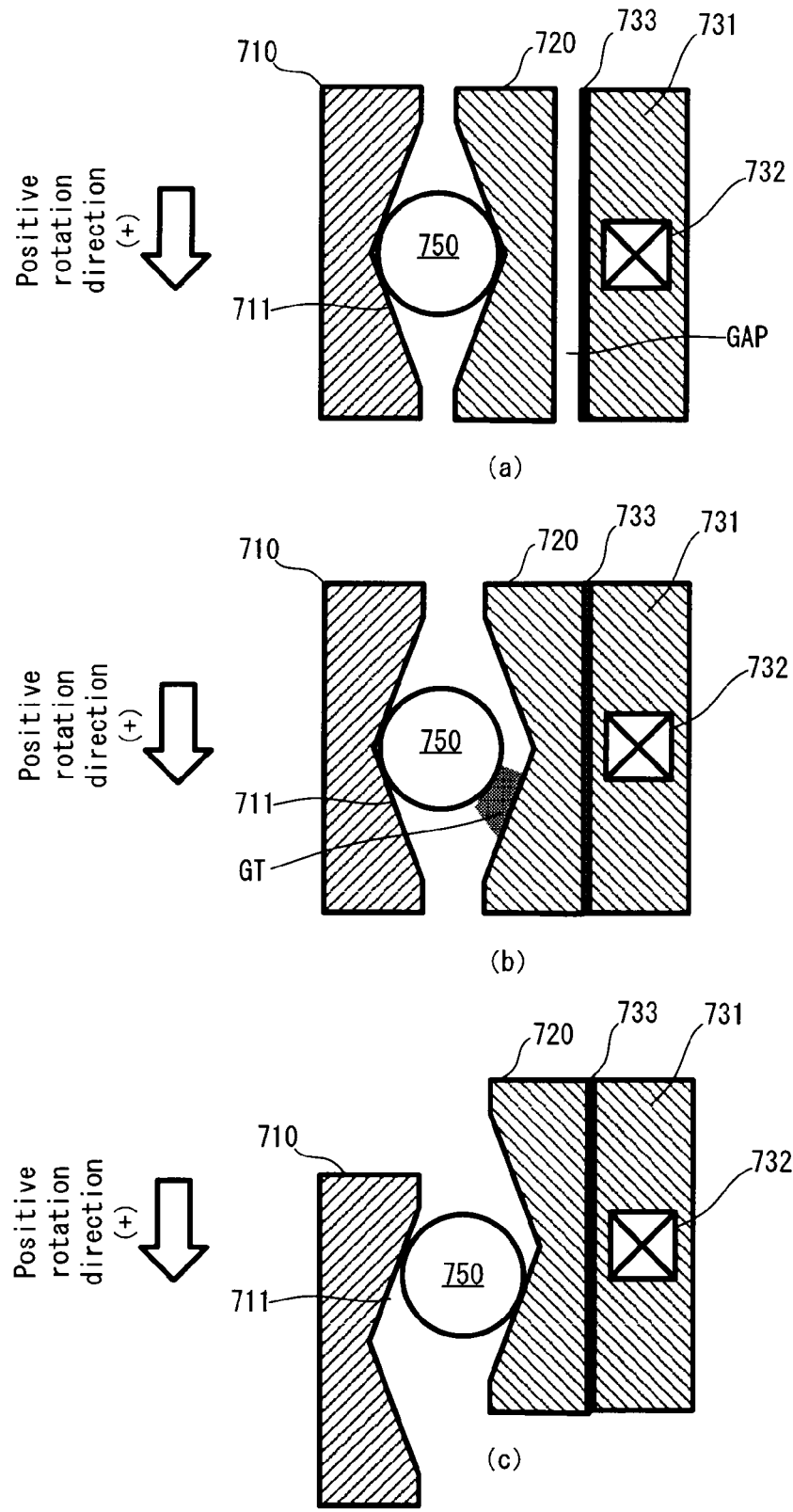
FIG. 6 are schematic cross sectional views explaining a state transition process in which a sun gear transfers from a release state to a lock state due to the locking action of a brake mechanism in FIG. 4.

In the hybrid drive apparatus 10, the locking mechanism 700 can selectively change the state of the sun gear S1 between the lock state and the release state, with the sun gear S1 as the "locked element" of the present invention. Incidentally, the sun gear S1 is coupled with the motor generator MG1 as described already, and if the sun gear S1 is in the lock state, the MG1 is also in the lock state in which the MG1 cannot rotate. Therefore, hereinafter, the situation that the sun gear S1 is in the lock state is expressed as that "the MG1 is in the lock state" or the like, as occasion demands. Now, with reference to FIG. 6, an explanation will be given on the locking action of the sun gear S1 by the locking mechanism 700. FIG. 6 are schematic cross sectional views explaining a state transition process in which the sun gear S1 transfers from the release state to the lock state due to the locking action of the locking mechanism 700. Incidentally, in FIG. 6, portions overlapping those of FIG. 4 or FIG. 5 will carry the same reference numerals, and the explanation thereof will be omitted as occasion demands.

In FIG. 6, FIG. 6(a) shows the same state as in FIG. 5, in which there is the opposed space GAP between the clutch plate 720 and the friction part 733 and in which the clutch plate 720 can rotate without an influence of a deterrent power by the friction part 733. Thus, by the action of the cam ball 750, the cam 710 and the clutch plate 720 can rotation substantially integrally. Here, the cam 710 is coupled with a rotor RT of the MG1 via the sun gear shaft 310, and the rotor RT is coupled with the sun gear S1 via the sun gear shaft 310. Therefore, in the hybrid drive apparatus 10, the cam 710 can be treated as a rotational element that rotates integrally with the sun gear S1. In other words, in the state shown in FIG. 6(a), the sun gear S1 can also rotate without restriction of the clutch plate 720. This state corresponds to one example of the "release state" of the present invention.

FIG. 6(b) shows a state in which an excitation current is supplied to the electromagnet 732 of the actuator 730. In other words, in this case, an electromagnetic force generated from the electromagnet 732 acts on the clutch plate 720 via the suction part 731, and the clutch plate 720 overpowers the biasing of the return spring 740, is displaced to a contact position antithetical to the non-contact position, and is adsorbed to the suction part 731. As a result, the opposed space GAP disappears. Moreover, simultaneously with the supply of the electromagnet by the excitation, the friction part 733 exerts a friction force on the clutch plate 720, and this hinders the operations of the clutch plate 720 in the positive rotational direction or negative rotational direction. In other words, in this state, the operations of the clutch plate 720 are hindered by the electromagnet 732 and the friction part 733, and the clutch plate 720 comes to rest with respect to the actuator 730, i.e. the case CS.

On the other hand, in the state that the clutch plate 720 is absorbed to the suction part 731 as described above, instead of the opposed space GAP that disappears, a play or backlash GT along the rotational direction is formed between the cam ball 750 and the clutch plate 720. Therefore, if the cam 710 is influenced by the rotation of the MG1 and rotates in the positive rotational direction or negative rotational direction, only the cam 710 and the cam ball 750 are displaced in the rotational direction. Incidentally, here, the explanation will be continued under the assumption that they are displaced in the positive rotational direction. Here, the newly formed play GT is reverse-tapered as viewed in the cross section, as described above. As the cam ball 750 moves in the rotational direction, the newly formed play GT is gradually reduced. Eventually, it disappears and comes into a play elimination completion state. In the play elimination completion state, the cam 710, the cam ball 750 and the clutch plate 720 come into contact with each other again.

FIG. 6(c) shows the play elimination completion state described above. If the cam 710 rotates in the positive rotational direction in this play elimination completion state, a pressing force which further presses the clutch plate 720 in the direction of the actuator 730 is generated on the cam ball 750 by the action of the reverse-tapered opposed surface. As a result, as long as a positive torque in the positive rotational direction is applied to the cam 710, even if the excitation of the electromagnet 732 is stopped, the contact state of the three does not change, and the cam 710 becomes in a so-called self-lock state due to the pressing force and the friction force given from the friction part 733.

In the self-lock state, the cam 710 also comes to rest, i.e. becomes in a fixed state, with respect to the case CS as in the clutch plate 720. As a result, the sun gear S1 which rotates integrally with the cam 710 also gets fixed to the case CS. This state is the lock state. In the lock state, the rotational speed of the sun gear S1, i.e. the MG1 rotational speed Nmg1, is zero.

Incidentally, here, it is assumed that the cam-lock type engaging apparatus which constitutes the locking mechanism 700 has the self-lock action. However, by adjusting the shape or the like of each of the opposed surfaces of the cam 710 and the clutch plate 720, it is also possible that this type of self-lock action is not provided. In that case, if the excitation of the electromagnet 732 is stopped, the clutch plate 720 is returned to the original non-contact position by the action of the return spring 740.

<1-2-2: Details of Speed Change Mode>

Figure 7:
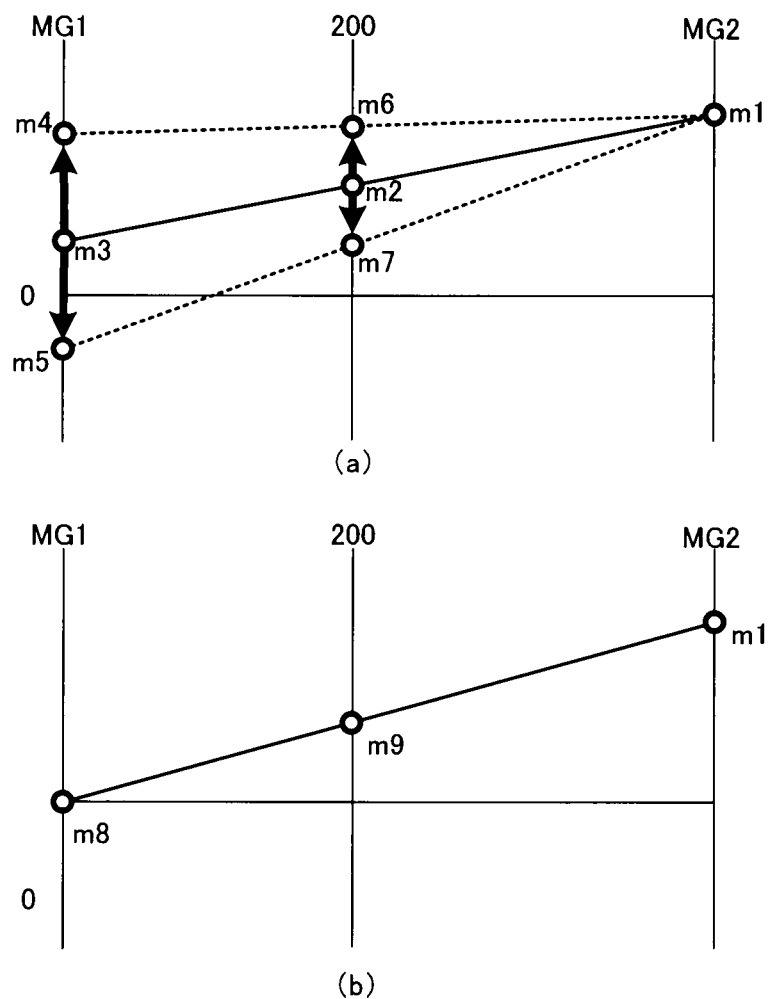
FIG. 7 are operational nomograms explaining the action of a power dividing mechanism in the hybrid drive apparatus in FIG. 2.

The hybrid vehicle 1 in the embodiment can select a fixed speed change mode or a stepless speed change mode as a speed change mode which is one example of the "power transmission mode" of the present invention, in accordance with the state of the sun gear S1. Now, with reference to FIG. 7, the speed change mode of the hybrid vehicle 1 will be explained. FIG. 7 are operational nomograms of the hybrid drive apparatus 10 explaining the action of the power dividing mechanism 300. Incidentally, in FIG. 7, portions overlapping those of FIG. 2 will carry the same reference numerals, and the explanation thereof will be omitted as occasion demands.

In FIG. 7(a), the vertical axis shows the rotational speed, and the horizontal axis shows the motor generator MG1 (uniquely meaning the sun gear S1), the engine 200 (uniquely meaning the carrier C1) and the motor generator MG2 (uniquely meaning the ring gear R1) from the left in order. Here, the power dividing mechanism 300 is a planetary gear mechanism, and if the rotational speeds of two elements out of the sun gear S1, the carrier C1, and the ring gear R1 are determined, the rotational speed of the remaining one element is inevitably determined. In other words, on the operational nomogram, the operating state of each rotational element can be expressed by one operational nomogram which corresponds to one operating state of the hybrid drive apparatus 10 in a one-to-one manner. Incidentally, hereinafter, a point on the operational nomogram will be expressed by an operating point mi (i is a natural number), as occasion demands. In other words, one operating point mi corresponds to one rotational speed.

In FIG. 7(a), it is assumed that the operating point of the MG2 is an operating point m1. In this case, if the operating point of the MG1 is an operating point m3, the operating point of the engine 200 coupled with the carrier C1 as the remaining one rotational element is an operating point m2. At this time, if the operating point of the MG1 is changed to an operating point m4 and an operating point m5 while the rotational speed of the drive shaft 500 is maintained, then, the operating point of the engine 200 is changed to an operating point m6 and an operating point m7, respectively.

In other words, in this case, by setting the motor generator MG1 as a rotational speed control apparatus, the engine 200 can be operated at a desired operating point. The speed change mode corresponding to this state is the stepless speed change mode. In the stepless speed change mode, the operating point of the engine 200 (the operating point in this case is defined by the combination of the engine rotational speed and the engine torque Te) is controlled to an optimal fuel economy operating point at which the fuel consumption rate of the engine 200 is basically minimized. Incidentally, it is obvious that the MG1 rotational speed Nmg1 needs to be variable in the stepless speed change mode. Thus, if the stepless speed change mode is selected, the drive state of the locking mechanism 700 is controlled such that the sun gear S1 is in the release state.

Here, further to that, in the power dividing mechanism 300, in order to supply the torque Ter corresponding to the engine torque Te described above to the drive shaft 500, it is necessary to supply a reaction torque having the same magnitude as that of and having the reversed sign (i.e. negative torque) of the aforementioned torque Tes which appears on the sun gear shaft 310 in accordance with the engine torque Te, from the motor generator MG1 to the sun gear shaft 310. In this case, in the operating points in a positive rotation area such as the operating point m3 or the operating point m4, the MG1 is in a power generation state having a positive rotation negative torque. In other words, in the stepless speed change mode, by making the motor generator MG1 (uniquely meaning the sun gear S1) function as a reaction element, one portion of the engine torque Te is supplied to the drive shaft 500, and electric power is generated in one portion of the engine torque Te distributed to the sun gear shaft 310. If an engine direct torque is insufficient for use as a torque required for the drive shaft 500, the torque Tmg2 is supplied to the drive shaft 500 from the motor generator MG2, as occasion demands, by using this generated electric power.

On the other hand, for example, in an operating condition in which the engine rotational speed NE is low although the MG2 rotational speed Nmg2 is high, such as in high-speed light-load driving, the MG1 has the operating point in a negative rotation area such as the operating point m5. In this case, the motor generator MG1 outputs a negative torque as the reaction torque of the engine torque Te, and it is in a negative-rotation negative-torque state and in a power-running state. In other words, in this case, the torque Tmg1 from the motor generator MG1 is transmitted to the drive shaft 500 as the drive torque of the hybrid vehicle 1.

On the other hand, the motor generator MG2 is in a negative-torque state because it absorbs a torque which is outputted to the drive shaft 500 and which is excessive for a required torque. In this case, the motor generator MG2 is in a positive-rotation negative-torque state and in the power generation state. In this state, there is an inefficient electrical path referred to as so-called power circulation, such as using a driving force from the MG1 to generate electricity on the MG2 and power-running driving the MG1 due to the generated power. In the situation that the power circulation takes place, the transmission efficiency of the hybrid drive apparatus 10 is likely reduced, and the system efficiency of the hybrid drive apparatus 10 is likely reduced.

Thus, in the hybrid vehicle 1, in an operating area set in advance such that the power circulation can take place, the sun gear S1 is controlled to be in the aforementioned lock state by the locking mechanism 700. The situation is shown in FIG. 7(b). When the sun gear S1 becomes in the lock state, inevitably, the motor generator MG1 also becomes in the lock state, and the operating point of the MG1 becomes an operating point m8 at which the rotational speed is zero. Thus, the operating point of the engine 200 becomes an operating point m9, and the engine rotational speed NE is uniquely determined from the MG2 rotational speed Nmg2 which uniquely means the vehicle speed V (i.e. a transmission gear ratio becomes constant). As described above, the speed change mode corresponding to the case where the MG1 is in the lock state is the fixed speed change mode.

In the fixed speed change mode, the reaction torque of the engine torque Te with which the motor generator MG1 is originally to be burdened can be replaced by the physical braking force of the locking mechanism 700. In other words, it is not necessary to control the motor generator MG1 to be either in the power generation state or in the power-running state, and it is possible to stop the motor generator MG1. Therefore, basically, it is no longer necessary to operate the motor generator MG2 either, and the MG2 becomes in a so-called idling state. In the end, in the fixed speed change mode, the drive torque that appears on the drive shaft 500 becomes only a direct component (refer to the equation (2)) divided to the drive shaft 500 side by the power dividing mechanism 300, out of the engine torque Te, and the hybrid drive apparatus 10 only performs mechanical power transmission. Thus, its transmission efficiency is improved.

<1-2-3: Details of MG1 Locking Control>

In the hybrid vehicle 1, the speed change mode is controlled to a speed change mode in which the system efficiency $\eta$sys of the hybrid drive apparatus 10 is higher, at each time, by the ECU 100. At this time, the ECU 100 refers to a speed change map stored in the ROM in advance. This speed change map is a two-dimensional map with a required driving force Ft shown on the vertical axis and the vehicle speed V shown on the horizontal axis. On the speed change map, an area in which the MG1 is controlled to the lock state to select the fixed speed change mode is defined as a MG1 lock area. Incidentally the required driving force Ft is the required value of the driving force applied to each drive shaft, and it is obtained from a required driving force map in which the vehicle speed V detected by the vehicle speed sensor 14 and the accelerator opening degree Acc detected by the accelerator opening sensor 13 are used as parameters. The ECU 100 performs the MG1 lock control if the operating condition of the hybrid vehicle 1 defined by the vehicle speed V and the required driving force Ft corresponds to the fixed speed change mode, thereby changing the speed change mode from the stepless speed change mode to the fixed speed change mode.

Figure 8:
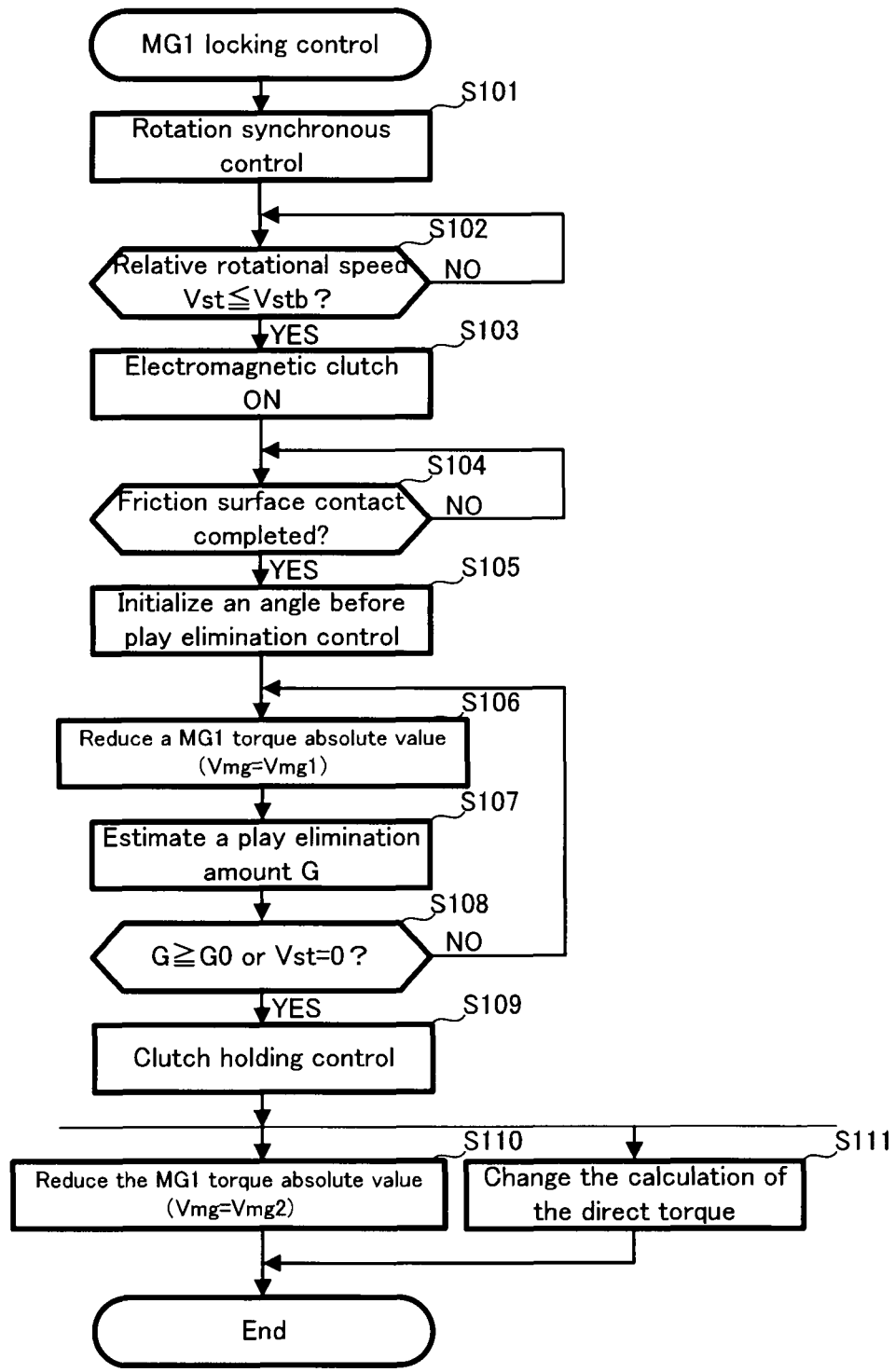
FIG. 8 is a flowchart showing MG1 locking control performed by an ECU in the hybrid vehicle in FIG. 1.

Now, with reference to FIG. 8, the details of the MG1 locking control will be explained. FIG. 8 is a flowchart showing the MG1 locking control.

In FIG. 8, the ECU 100 performs rotation synchronous control (step S101). Here, the rotation synchronous control indicates control in which the rotational speeds of the suction part 731 of the actuator 730 and the clutch plate 720 are synchronized. Incidentally, the wording "synchronous" defined herein means that a rotational speed difference is less than or equal to an allowable value which is near zero.

On the other hand, the suction part 731 is the fixed element which is fixed to the case CS, and its rotational speed is zero. The rotational speed of the clutch plate 720 is equivalent to those of the cam 710 and the motor generator MG1. Therefore, the rotational speed difference between the suction part 731 and the clutch plate 720, i.e. a relative rotational speed Vst, is substantially equivalent to the MG1 rotational speed Nmg1. Thus, in the step S101, the ECU 100 reduces the MG1 rotational speed Nmg1 to a rotational speed which is less than or equal to the aforementioned allowable value.

If the rotation synchronous control is started, the ECU 100 judges whether or not the relative rotational speed Vst decreases to an allowable value Vstb or less (step S102). If the relative rotational speed Vst is greater than the allowable value Vstb (the step S102: NO), the ECU 100 waits until the relative rotational speed Vst decreases to the allowable value Vstb or less. If the relative rotational speed Vst decreases to the allowable value Vstb or less (the step S102: YES), the ECU 100 supplies an excitation current to the electromagnet 732 of the actuator 730 through the drive control of the PCU 500 (step S103).

If the excitation current is supplied, as described above, the clutch plate 720 is drawn to the suction part 731 and transmits to the state that it is in contact with the friction part 733. The ECU 100 judges whether or not the clutch plate 720 is in contact with the friction part 733 (step S104). While the clutch plate 720 is not in contact with the friction part 733 (the step S104: NO), the ECU 100 waits the process. Incidentally, whether or not the contact with the friction part 733 is completed may be judged from an electrification time length from the start of the excitation, or from a torque change of the motor generator MG1 due to the separation of the clutch plate 720 from the cam 710. As a simpler method, a position sensor capable of detecting the displacement in the opposed direction of the clutch plate 720 may be disposed in the vicinity of the clutch plate 720 to refer to its sensor output.

If the clutch plate 720 transfers to the contact state that it is in contact with the friction part 733 (the step S104: YES), the ECU 100 initializes an angle before play elimination control (step S105). Here, the initialization of the angle before the play elimination control means a process of setting as an initial value a remaining amount just after the formation (i.e. an angle unit herein) of the play generated between the clutch plate 720 and the cam 710 when MG1 locking is performed by the locking mechanism 700. This initial value can be known as a design value in advance due to the structure of the locking mechanism 700 in which a relative phase between the cam 710 and the clutch plate 720 before the formation of the play remains unchanged. Moreover, even if it is not known as the design value, once it is held as a leaned value, the initial value remains unchanged after that. In the embodiment, it is assumed that the initial value is obtained experimentally in advance and is stored in the ROM as a fixed value. However, this initial value may be corrected, as occasion demands, by using a time value until the clutch plate 720 comes into contact with the friction part 733, or the magnitude of the gap part GAP formed between he friction part 733 and the clutch plate 720 (i.e. a stroke volume required for the clutch plate 720 to come into contact with the friction part 733).

If the initialization of the angle before the play elimination control is completed, a play elimination process performed by the phase control of the cam 710 is performed. At this time, firstly, the ECU 100 gradually reduces a motor torque Tmg1 which is the torque of the motor generator MG1 (step S106). At this time, the reduction rate of the motor torque Tmg1 is set to a change rate Vmg1 set in advance. Incidentally, the change rate Vmg1 is a value on a relatively low speed side, determined by experimental fitting in advance.

On the other hand, at a time point at which the clutch plate 720 comes into contact with the friction part 733, the rotational speed of the clutch plate 720 becomes zero, and a rotational difference occurs between the clutch plate 720 and the cam 710. In other words, from this time point, the remaining amount of the play between the clutch plate 720 and the cam 710 starts to decrease from the initial value. The process of gradually reducing the motor torque Tmg1 is performed in a form that it is synchronized with the decrease in the play remaining amount. Incidentally, if the gradual reduction in the motor torque Tmg1 is started, the relative rotational speed between the cam 710 and the clutch plate 720 becomes slightly greater than that at the contact time point of the clutch plate 720 and the friction part 733.

If starting to gradually reduce the motor torque Tmg1, the ECU 100 estimates a play elimination amount G (step S107). Incidentally, the maximum value of the play elimination amount G is the initial value set in advance. Incidentally, the play elimination amount G is calculated as the integral value of the rotational speed of the cam 710, i.e. the integral value of the MG1 rotational speed Nmg1, and it has a substantially one-to-one relation with the actual play remaining amount because it is constantly added to the previous play elimination amount G.

If the play elimination amount G is estimated, the ECU 100 judges whether or not either a first condition or a second condition is satisfied, wherein the first condition is defined as that the estimated play elimination amount G is greater than or equal to a reference value G0 set in advance, and the second condition is defined as that the relative rotational speed Vst between the clutch plate 720 and the cam 710 is zero (step S108). If neither is satisfied (the step S108: NO), the ECU 100 returns the process to the step S106 and repeats a series of the process operations. As a result, if either of the conditions is satisfied (the step S108: YES), the ECU 100 reduces the excitation current to a holding current set in advance under the judgment that the play elimination process is completed and that the electromagnetic force of the electromagnet 732 can be reduced due to the self-lock action described above (step S109).

Then, the ECU 100 further reduces the absolute value of the motor torque Tmg1, in order to transfer the reaction torque of the engine torque to the locking mechanism 700. In this case, the reduction speed of the motor torque Tmg1 is set to the change speed Vmg2. which is a preset value. In addition, the change speed Vmg2 is the value of the relatively fast, which is determined by pre-experimental fit, and the "Vmg2>Vmg1" relationship is established. Namely, if the remaining amount of the formed play is smaller than or equal to an allowable value, the torque shock is not evident if the motor torque Tmg1 is reduced relatively rapidly. In order words, the aforementioned reference value G0 for the play elimination amount G is set as meeting these requirements.

Here, in the aforementioned stepless speed change mode, the direct torque Ter which appears on the drive shaft 500 out of the engine torque Te is estimated by using the reaction torque of the motor generator MG1 as the reaction element. In other words, the direct torque Tes is estimated by multiplying the motor torque Tmg1 by "$-1/\rho$" from the aforementioned equation (1) of "Tes=$-$Te$\times\rho/(1+\rho)$" and the aforementioned equation (2) of "Ter=Te$\times 1/(1+\rho)$" under the assumption that the torque component Tes which appears on the sun gear S1 (cam 710) out of the engine torque Te is equal to the motor torque Tmg1. Thus, if the estimation of the direct torque Ter in which the motor generator Mg1 is used as a torque sensor is continued in the fixed speed change mode, it is hard to estimate the direct torque Ter after the reaction torque is passed to the locking mechanism 700. As a result, the direct torque Ter is likely separated from a driver request torque and causes a torque shock.

Thus, the ECU 100 changes a method of calculating the direct torque Ter in parallel with the step S110 (step S111). More specifically, the direct torque Ter is calculated by multiplying the engine torque Te by a fixed gear ratio Gr determined by the gear ratio between the rotational elements of the power dividing mechanism 300. The torque of the drive shaft 500 is preferably maintained for the driver request torque by compensating for a shortage of the direct torque Ter with the motor torque Tmg2 from the motor generator MG2. As a result, the torque shock in the transition from the stepless speed change mode and the fixed speed change mode is reduced, and a seamless change in the speed change mode is realized. If the step S110 and the step S111 are performed, the MG1 locking control is ended.

Figure 9:
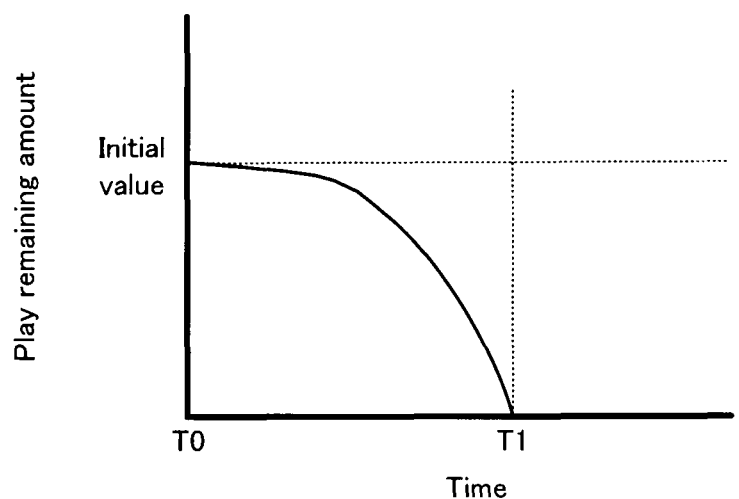
FIG. 9 is a characteristic diagram associated with the effect of the MG1 locking control in FIG. 8 and explaining the temporal transition of a play remaining amount.

Now, with reference to FIG. 9, the effect of the embodiment will be explained. FIG. 9 is a characteristic diagram illustrating one temporal transition of the play remaining amount in a period of performing the MG1 locking control in the embodiment.

In FIG. 9, if the time point at which the clutch plate 720 comes into contact with the friction part 733 is a reference time point T0, the remaining amount at the reference time point T0 is equal to the aforementioned initial value. After the time point T0, the play remaining amount decreases from the initial value by an amount corresponding to the rotational difference between the clutch plate 720 and the cam 710 (i.e. which is a rotational difference between the clutch plate 720 and the friction part 733 before the clutch plate 720 comes into contact with the friction part 733 and which is defined by the relative rotational speed Vst).

If the rotational difference is too small, i.e. if the reduction rate of the play remaining amount in FIG. 9 is maintained at an extremely small value near the time point T0, a physical impulse itself in the play elimination is reduced, but a time required for the MG1 locking is increased. Thus, as described above, the gradual reduction in the motor torque Tmg1 is started, and the play elimination amount converges on zero, more quickly than the beginning of the play elimination. As a result, at a time point T1, the play remaining amount becomes zero (which is zero in FIG. 9; however, it may be a value obtained by subtracting the reference value G0 from the initial value as described above).

As described above, in the first embodiment, by knowing the play elimination amount G all the time, the phase control of the cam 710 to which the play remaining amount is fed back is performed. As a result, the physical impulse when the play remaining amount is zero is reduced, and in the transition from the stepless speed change mode to the fixed speed change mode, the transition to the fixed speed change mode (i.e. one example of the "transition to the lock state of the locked element" in the present invention) can be performed efficiently while drivability and reliability are ensured.

Figure 10:
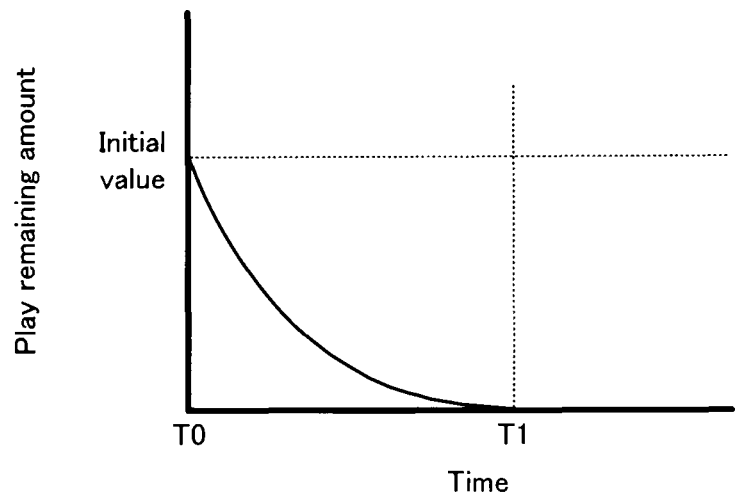
FIG. 10 is a characteristic diagram explaining the temporal transition of a play remaining amount associated with the effect of another MG1 locking control similar to the MG1 locking control in FIG. 8.

Incidentally, in the embodiment, the play elimination process is performed by using the phase control of the cam 710. If phase synchronous control which takes into account the rotational speed of the cam 710 is performed, it is possible to transfer to the fixed speed change mode, more efficiently and effectively. Here, the "phase synchronous control" means that the rotational speed and the phase of the cam 710 are controlled mutually cooperatively such that the relative rotational speed between the cam 710 and the clutch plate 720 converges near zero at a time point of the completion of the play elimination. Now, with reference to FIG. 10, an explanation will be given on the temporal transition of the play remaining amount if the phase synchronous control is performed. FIG. 10 is a characteristic diagram illustrating one temporal transition of the play remaining amount if the phase synchronous control is performed. Incidentally, in FIG. 10, portions overlapping those of FIG. 9 will carry the same reference numerals, and the explanation thereof will be omitted as occasion demands.

In FIG. 10, if the phase synchronous control is performed, the play remaining amount asymptotically approaches to zero, exponentially, from the time point T9 to the time point T1 at which the play elimination is completed. Thus, the torque shock when the play elimination is completed is reduced, extremely well.

Second Embodiment

Figure 11:
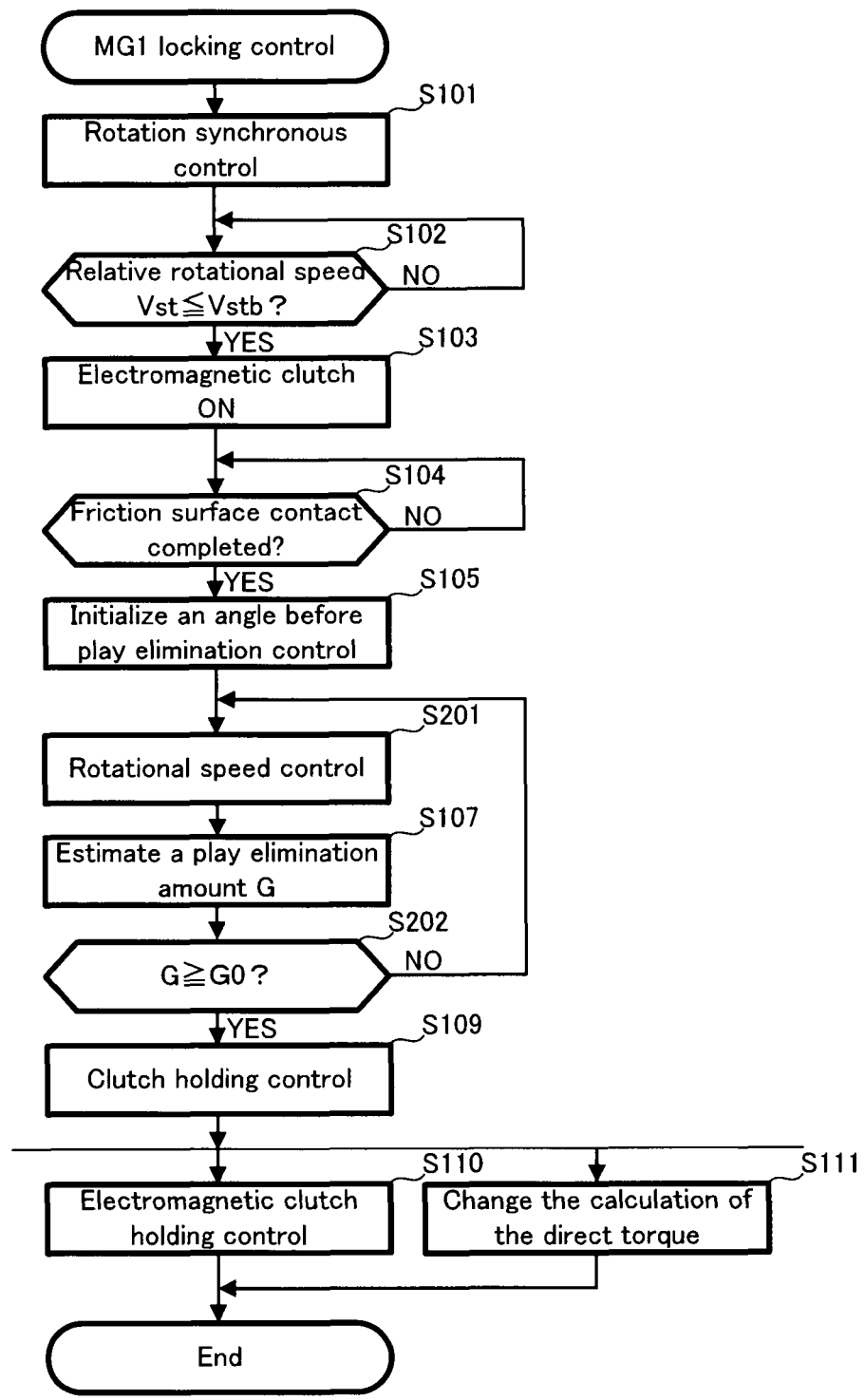
FIG. 11 is a flowchart showing MG1 locking control in a second embodiment of the present invention.

Next, with reference to FIG. 11, MG1 locking control in a second embodiment of the present invention will be explained. FIG. 11 is a flowchart showing the MG1 locking control in the second embodiment. Incidentally, in FIG. 11, portions overlapping those of FIG. 8 will carry the same reference numerals, and the explanation thereof will be omitted as occasion demands. Moreover, a system configuration in the second embodiment is equivalent to that of the hybrid vehicle 1 in the first embodiment.

In FIG. 11, if the initialization of the angle before the play elimination control in the step S105 is performed, the ECU 100 performs the play elimination process performed by the rotational speed control of the cam 710 (step S201). If the play elimination process is started, the play elimination amount G is estimated (the step S107), and it is judged whether or not the play elimination amount G is greater than or equal to the reference value G0 (step S202). In a period in which the play elimination amount is less than the reference value G0 (the step S202: NO), the process is returned to the step S201. If the play elimination amount is greater than or equal to the reference value G0 (the step S202: YES), the process is moved to the step S109.

Figure 12:
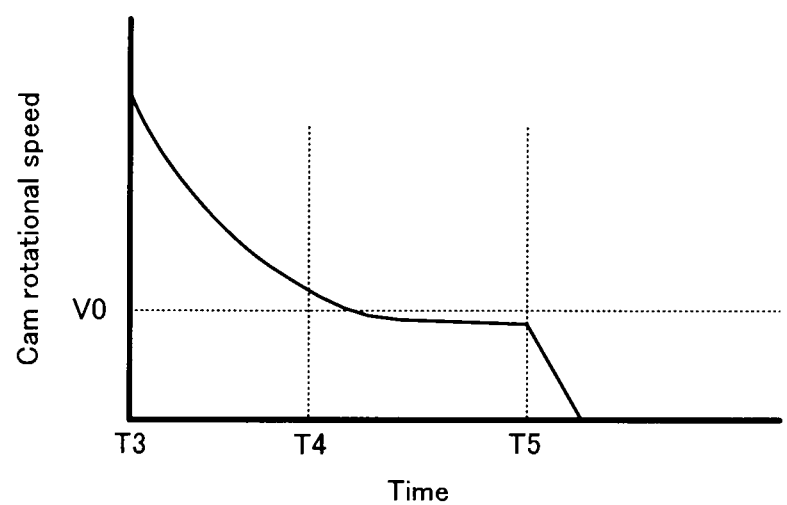
FIG. 12 is a characteristic diagram explaining the temporal transition of a cam rotational speed associated with the effect of the second embodiment.

Now, with reference to FIG. 12, the effect of the MG1 locking control in the second embodiment described above will be explained. FIG. 12 is a characteristic diagram illustrating one temporal transition of the rotational speed of the cam 710 in a period of performing the MG1 locking control in the second embodiment.

In FIG. 12, in a period before a time point T4, the rotation synchronous control in the step S101 is performed. It is assumed that the rotation synchronous control is completed, that the excitation current is supplied to the electromagnet 732 at the time point T4, and that the clutch plate 720 comes into contact with the friction part 733. Here, particularly in the embodiment, it is defined in advance that the play elimination process is performed by using the rotational speed of the clutch 710, i.e. the MG1 rotational speed Nmg1. Thus, it is possible to set the allowable value of the rotation synchronization control when the clutch plate 720 is in contact with the friction part 733 to a value on a higher-revolution side in comparison with the first embodiment.

In other words, if the clutch plate 722 is fixed on a higher-speed side than a synchronization rotational speed near zero rotation and if the rotational speed of the cam 710 is gradually reduced in the vicinity of an allowable value V0 (e.g. a value of about 10 rpm) set in advance while the play remaining amount G is fed back from that time point, then, the torque shock when the play elimination is completed at a time point T5 is preferably reduced. At this time, the rotational speed of the cam 710 is controlled to a lower-speed side just before the completion of the play elimination in comparison with the beginning of the play elimination. Thus, the torque shock is reduced, efficiently and effectively.

According to the second embodiment described above, in comparison with the phase control in the first embodiment, a control load increases because the cam rotational speed which has a stronger correlation with the torque shock is a control target; however, it is useful in terms of the reduction in the torque shock.

Third Embodiment

Figure 13:
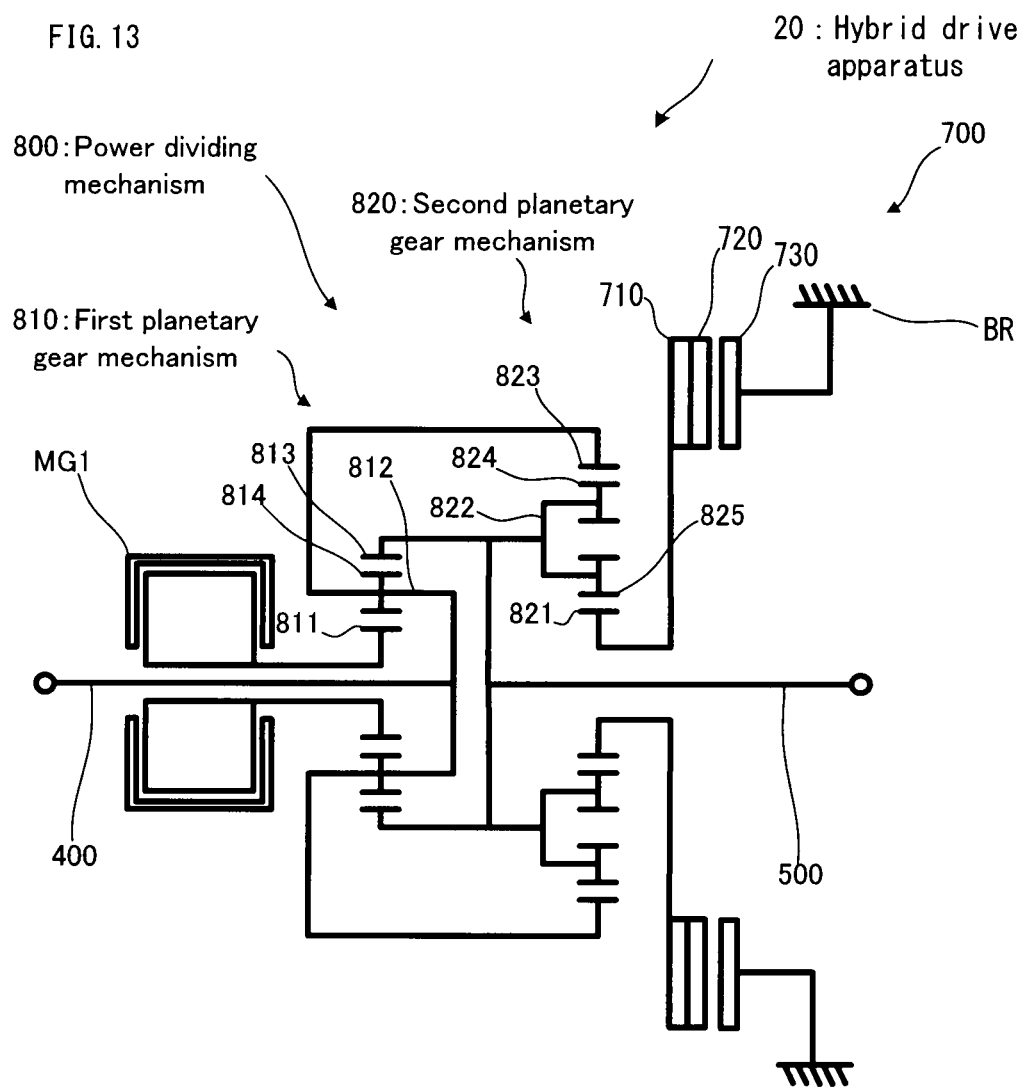
FIG. 13 is a schematic configuration diagram conceptually showing the structure of a hybrid drive apparatus in a third embodiment of the present invention.

In the first and second embodiments described above, the MG1 is locked (to be correct, the MG1 is clocked through the sun gear S1 and the cam 710) when the hybrid drive apparatus 10 adopts the fixed speed change mode. However, the structure of the hybrid drive apparatus in obtaining the fixed speed change mode is not limited to this type of MG1 locking. Now, with reference to FIG. 13, the structure of another hybrid drive apparatus will be explained. FIG. 13 is a schematic configuration diagram conceptually showing the structure of a hybrid drive apparatus 20 in a third embodiment of the present invention. Incidentally, in FIG. 13, portions overlapping those of FIG. 2 will carry the same reference numerals, and the explanation thereof will be omitted as occasion demands.

In FIG. 13, the hybrid drive apparatus 20 has a different structure from that of the hybrid drive apparatus 10 in that it is provided with a power dividing mechanism 800 as another example of the "power transmission mechanism" of the present invention, instead of the power dividing mechanism 300. The power dividing mechanism 800 adopts a form of a so-called Ravigneaux-type planetary gear mechanism, provided with a first planetary gear mechanism 810 of a single pinion gear type and a second planetary gear mechanism 820 of a double pinion type, as a differential mechanism made of a plurality of rotational elements.

The first planetary gear mechanism 810 is provided with: a sun gear 811; a carrier 812; a ring gear 813; and a pinion gear 814 meshing with the sun gear 811 and the ring gear 813, which is held by the carrier 812 so as to rotate on its axis in the axial direction and to revolve due to the rotation of the carrier 812. The rotor of the motor generator MG1 is coupled with the sun gear 811, the input shaft 400 is coupled with the carrier 812, and the drive shaft 500 is coupled with the ring gear 813.

The second planetary gear mechanism 820 is provided with: a sun gear 821; a carrier 822; a ring gear 823; and a pinion gear 824 meshing with the ring gear 823 and a pinion gear 825 meshing with the sun gear 821, each of which is held by the carrier 822 so as to rotate on its axis in the axial direction and to revolve due to the rotation of the carrier 822. The cam 710 (not illustrated) of the brake mechanism 700 is coupled with the sun gear 821. In other words, in the embodiment, the sun gear 821 functions as another example of the "locked element" of the present invention.

As described above, the power dividing mechanism 800 is provided with four rotational elements in total, which are on the whole a first rotational element group composed of the sun gear 811 of the first planetary gear mechanism 810, the sun gear 821 (locked element) of the second planetary gear mechanism 820, the carrier 812 of the first planetary gear mechanism 810 and the ring gear 823 of the second planetary mechanism 820 which are coupled with each other, and a second rotational element group composed of the ring gear 813 of the first planetary gear mechanism 810 and the carrier 822 of the second planetary gear mechanism 820 which are coupled with each other.

According to the hybrid drive apparatus 20, if the sun gear 821 becomes in the lock state and its rotational speed becomes zero, then, the second rotational element group having a rotational speed uniquely meaning the vehicle speed V and the sun gear 821 define the rotational speed of the first rotational element group as the remaining one rotational element. The carrier 812 which constitutes the first rotational element group is coupled with the input shaft 400 coupled with the crankshaft 205 of the engine 200 (not illustrated). Thus, in the end, the engine rotational speed NE of the engine 200 has a unique relation with the vehicle speed V, and the fixed speed change mode is realized. As described above, the fixed speed change mode can be realized in the configuration other than the hybrid drive apparatus 10. In accordance with that, the lock target of the brake mechanism 700 may be changed as occasion demands. In any case, in the control apparatus for the hybrid vehicle of the present invention, it is possible to preferably reduce the torque shock which occurs in the play elimination when the locked element transmits to the lock state.

Fourth Embodiment

Figure 14:
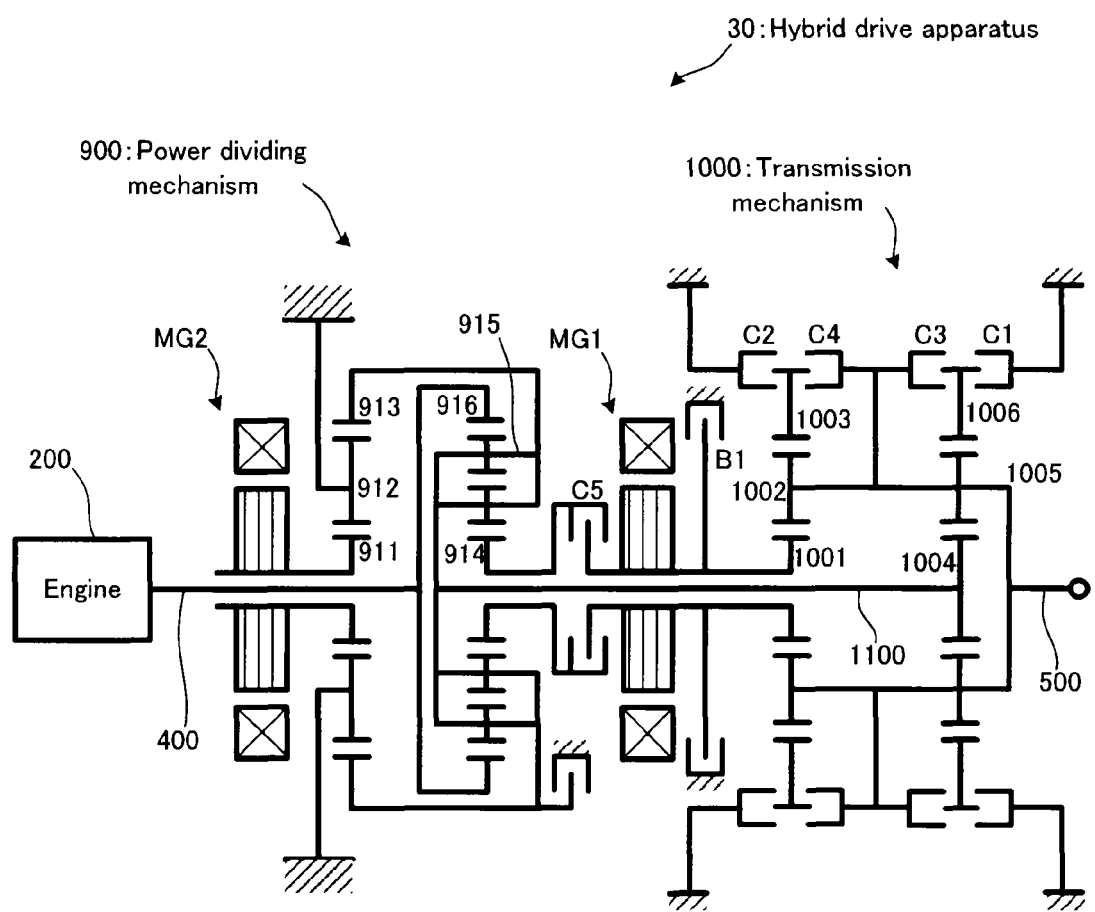
FIG. 14 is a schematic configuration diagram conceptually showing the structure of a hybrid drive apparatus in a fourth embodiment of the present invention.

In the first to third embodiments described above, the "locking element" of the present invention is the suction part 731 (case CS) as the fixed element; however, the "locking element" of the present invention may be not the fixed element but the rotational element. Now, with reference to FIG. 14, the structure of another hybrid drive apparatus will be explained. FIG. 14 is a schematic configuration diagram conceptually showing the structure of a hybrid drive apparatus 30 in a fourth embodiment of the present invention. Incidentally, in FIG. 14, portions overlapping those of FIG. 2 will carry the same reference numerals, and the explanation thereof will be omitted as occasion demands.

In the fourth embodiment, the hybrid drive apparatus 30 is provided with: a power dividing mechanism 900 as yet another example of the "power transmission mechanism" of the present invention; and a transmission mechanism 1000.

The power dividing mechanism 900 is a complex-type planetary gear mechanism having the configuration that two types of planetary gear mechanisms are coupled with each other.

The power dividing mechanism 900 is a planetary gear mechanism of a double pinion gear having: a sun gear 911 (e.g. another example of the "second rotational element" of the present invention) with which the output shaft of the motor generator MG2 is coupled; a carrier 912 which supports a pinion gear (whose reference numeral is omitted) so as to rotate on its axis and to revolve integrally and which is physically fixed to the outer case of the power dividing mechanism 900 such that it cannot rotate; a ring gear 913; a sun gear 914 (i.e. another example of the "first rotational element" of the present invention) coupled with one of the engaging elements of a cutoff clutch C5 described later; an inner pinion gear meshing with the sun gear 914; a ring gear 916 (i.e. another example of the "third rotational element" of the present invention) coupled with the input shaft 400 which is coupled with the crankshaft 205 of the engine 200 and which rotates integrally with the crankshaft 205; an outer pinion gear (whose reference numeral is omitted) meshing with the ring gear 916; and a carrier 915 which supports each of the inner pinion gear and the outer pinion gear so as to rotate on its axis and to revolve integrally, which is coupled with the aforementioned the ring gear 913, and which is coupled with an intermediate shaft 1100. Incidentally, each of the gears which constitute the power dividing mechanism 900 is one example of the "rotational element" of the present invention.

The transmission mechanism 1000 is provided with: a complex-type planetary gear mechanism in which two types of planetary gear mechanisms of a single pinion type are coupled with each other; and transmission clutches C1 to C4.

One of the planetary gear mechanisms in the transmission mechanism 1000 has: a sun gear 1001 coupled with the output shaft of the motor generator MG1 and the other engaging element of the cutoff clutch C5; a carrier 1002 which supports a pinion gear (whose reference numeral is omitted) so as to rotate on its axis and to rotate integrally, which is coupled with the drive shaft 500 as the power output shaft of the hybrid drive apparatus 30, and which is coupled with one engaging element of each of the transmission clutches C3 and C4 described later; and a ring gear 1003 coupled with one engaging element of the transmission clutch C2 described later and the other engaging element of the transmission clutch C4.

The other planetary gear mechanisms in the transmission mechanism 1000 has: a sun gear 1004 coupled with the aforementioned carrier 915; a carrier 1005 which supports a pinion gear (whose reference numeral is omitted) so as to rotate on its axis and to revolve integrally, which is coupled with the drive shaft 500 (inevitably coupled with the carrier 1002), and which is coupled with the one engaging element of each of the transmission clutches C3 and C4 as in the carrier 1002; and a ring gear 1006 coupled with one engaging element of the transmission clutch C1 described later and the other engaging element of the transmission clutch C3.

The transmission clutch C1 is a dog clutch mechanism as another example of the "locking mechanism" of the present invention. The transmission clutch C1 is provided with two clutch plates which are opposed to each other and in which dog teeth which can mesh with each other are formed on each of the opposed surfaces, as another example of the "first engaging element" and the "second engaging element" of the present invention. One of the clutch plates of the transmission clutch C1 is coupled with the ring gear 1006, and the other clutch plate is physically fixed. Since the transmission clutch C1 is engaged by that the dog teeth of the clutch plates mesh with each other, the rotation synchronization is required in the engagement (incidentally, strictly speaking, the phase synchronization of the dog teeth is also required; however, it is omitted herein). Particularly in the transmission clutch C1, the other clutch plate is physically fixed, and its rotational speed is zero. Thus, in the engagement, there is required the rotation synchronous control of setting the rotational speed of the ring gear 1006 to be zero. Incidentally, in the engagement of the clutch plates, the clutch plate on the ring gear 1006 side is stroked toward the clutch plate on the fixed side in the state of the rotation synchronization. A driving force required to stroke the clutch plate is supplied by a not-illustrated drive system which is electrically connected to the ECU 100 and which is superior controlled by the ECU 100. Further to that, if the transmission clutch C1 adopts an engaging state in which the clutch plates are engaged, the rotational speed of the ring gear 1006 becomes zero and the rotational speed of the carrier 1005 uniquely means the vehicle speed. Thus, the rotational speed of the sun gear 1004 which is the remaining one rotational element is uniquely defined. On the other hand, although the sun gear 1005 is coupled with the ring gear 913 via the carrier 915, the carrier 912 is physically fixed. Thus, after all, if the transmission clutch C1 is in the engaging state, the rotational speed Nmg2 of the MG2 becomes unique in accordance with the vehicle speed.

The transmission clutch C2 is a dog clutch mechanism as another example of the "locking mechanism" of the present invention. The transmission clutch C2 is provided with two clutch plates which are opposed to each other and in which dog teeth which can mesh with each other are formed on each of the opposed surfaces, as another example of the "first engaging element" and the "second engaging element" of the present invention. One of the clutch plates of the transmission clutch C2 is coupled with the ring gear 1003, and the other clutch plate is physically fixed. Since the transmission clutch C2 is engaged by that the dog teeth of the clutch plates mesh with each other, the rotation synchronization is required in the engagement (incidentally, strictly speaking, the phase synchronization of the dog teeth is also required; however, it is omitted herein). Particularly in the transmission clutch C2, the other clutch plate is physically fixed, and its rotational speed is zero. Thus, in the engagement, there is required the rotation synchronous control of setting the rotational speed of the ring gear 1003 to be zero. Incidentally, in the engagement of the clutch plates, the clutch plate on the ring gear 1003 side is stroked toward the clutch plate on the fixed side in the state of the rotation synchronization. A driving force required to stroke the clutch plate is supplied by a not-illustrated drive system which is electrically connected to the ECU 100 and which is superior controlled by the ECU 100. Further to that, if the transmission clutch C2 adopts the engaging state in which the clutch plates are engaged, the rotational speed of the ring gear 1003 becomes zero and the rotational speed of the carrier 1002 uniquely means the vehicle speed. Thus, the rotational speed of the sun gear 1001 which is the remaining one rotational element is uniquely defined. On the other hand, since the sun gear 1001 is coupled with the MG1. Thus, after all, if the transmission clutch C2 is in the engaging state, the rotational speed Nmg1 of the MG21 becomes unique in accordance with the vehicle speed.

The transmission clutch C3 is a dog clutch mechanism as another example of the "locking mechanism" of the present invention. The transmission clutch C3 is provided with two clutch plates which are opposed to each other and in which dog teeth which can mesh with each other are formed on each of the opposed surfaces, as another example of the "first engaging element" and the "second engaging element" of the present invention. One of the clutch plates of the transmission clutch C3 is coupled with the carriers 1002 and 1005, and the other clutch plate is fixed to the ring gear 1006. Since the transmission clutch C3 is engaged by that the dog teeth of the clutch plates mesh with each other, the rotation synchronization is required in the engagement (incidentally, strictly speaking, the phase synchronization of the dog teeth is also required; however, it is omitted herein). Incidentally, in the engagement of the clutch plates, the clutch plate on the ring gear 1006 side is stroked toward the clutch plate on the carrier side in the state of the rotation synchronization. A driving force required to stroke the clutch plate is supplied by a not-illustrated drive system which is electrically connected to the ECU 100 and which is superior controlled by the ECU 100. Further to that, if the transmission clutch C3 adopts the engaging state in which the clutch plates are engaged, the rotational speed of the ring gear 1006 and the rotational speed of the carrier 1005 are equal to the rotational speed of the drive shaft 500. Thus, the rotational speed of the sun gear 1004 which is the remaining one rotational element is also equal to the rotational speed of the drive shaft 500.

The transmission clutch C4 is a dog clutch mechanism as another example of the "locking mechanism" of the present invention. The transmission clutch C4 is provided with two clutch plates which are opposed to each other and in which dog teeth which can mesh with each other are formed on each of the opposed surfaces, as another example of the "first engaging element" and the "second engaging element" of the present invention. One of the clutch plates of the transmission clutch C4 is coupled with the carriers 1002 and 1005, and the other clutch plate is fixed to the ring gear 1003. Since the transmission clutch C4 is engaged by that the dog teeth of the clutch plates mesh with each other, the rotation synchronization is required in the engagement (incidentally, strictly speaking, the phase synchronization of the dog teeth is also required; however, it is omitted herein). Incidentally, in the engagement of the clutch plates, the clutch plate on the ring gear 1003 side is stroked toward the clutch plate on the carrier side in the state of the rotation synchronization. A driving force required to stroke the clutch plate is supplied by a not-illustrated drive system which is electrically connected to the ECU 100 and which is superior controlled by the ECU 100. Further to that, if the transmission clutch C4 adopts the engaging state in which the clutch plates are engaged, the rotational speed of the ring gear 1003 and the rotational speed of the carrier 1002 are equal to the rotational speed of the drive shaft 500. Thus, the rotational speed of the sun gear 1001 which is the remaining one rotational element is also equal to the rotational speed of the drive shaft 500.

Incidentally, both the transmission clutch C2 and the transmission clutch C4 do not simultaneously become in the engaging state, and both the transmission clutch C1 and the transmission clutch C3 do not simultaneously become in the engaging state.

The hybrid drive apparatus 30 is provided with the cutoff clutch C5. The cutoff clutch C5 is a dog clutch mechanism as another example of the "locking mechanism" of the present invention. The cutoff clutch C5 is an engaging apparatus provided with two clutch plates which are opposed to each other and in which dog teeth which can mesh with each other are formed on each of the opposed surfaces, as the engaging elements. One of the clutch plates of the cutoff clutch C5 is coupled with the sun gear 914, and the other clutch plate is fixed to the sun gear 1001 of the transmission mechanism 1000. Since the cutoff clutch C5 is engaged by that the dog teeth of the clutch plates mesh with each other, the rotation synchronization is required in the engagement (incidentally, strictly speaking, the phase synchronization of the dog teeth is also required; however, it is omitted herein). Incidentally, in the engagement of the clutch plates, the clutch plate on the sun gear 1001 side is stroked toward the clutch plate on the sun gear 914 side in the state of the rotation synchronization. A driving force required to stroke the clutch plate is supplied by a not-illustrated drive system which is electrically connected to the ECU 100 and which is superior controlled by the ECU 100. Further to that, if the transmission clutch C5 adopts the engaging state in which the clutch plates are engaged, the rotational speed of the sun gear 1001 is equal to the rotational speed of the sun gear 914.

The hybrid drive apparatus 30 is further provided with a brake B1. The brake B1 is an engaging device of a wet multiplate friction engagement type in which one of its brake plates is physically fixed. The other brake plates of the brake B1 is coupled with the rotating shaft of the MG1. In a state in which the brake plates of the brake B1 engage with each other, the rotation of the MG1 is blocked, and the so-called MG locking is realized. Incidentally, a drive system for driving the brake B1 is electrically connected to the ECU 100 and is superior controlled by the ECU 100.

The structure of the hybrid drive apparatus 30 described above is one example of a so-called multi-mode hybrid drive apparatus. Due to the control of the engaging state of each transmission clutch, it is possible to realize a plurality of transmission steps or gear stages while selectively changing the reaction element and the output element between the MG1 and the MG2. At this time, each transmission clutch is the dog clutch mechanism, and in the final engagement, as in the first to third embodiments, the play elimination process is required in the rotational direction of the dog teeth. Thus, it is possible to apply the various play elimination processes as those in the first to third embodiments described above.

The present invention is not limited to the aforementioned embodiments, but various changes may be made, if desired, without departing from the essence or spirit of the invention which can be read from the claims and the entire specification. A control apparatus for a hybrid vehicle, which involves such changes, is also intended to be within the technical scope of the present invention.

DESCRIPTION OF REFERENCE CODES 1 hybrid vehicle
10 hybrid drive apparatus
20 hybrid drive apparatus (third embodiment)
30 hybrid drive apparatus (third embodiment)
100 ECU
200 engine
205 crankshaft
300 power dividing mechanism
310 sun gear shaft
S1 sun gear
C1 carrier
R1 ring gear
MG1 motor generator
MG2 motor generator
400 input shaft
500 drive shaft
600 reduction gear mechanism
700 locking mechanism
800 power dividing mechanism (third embodiment)
900 power dividing mechanism (fourth embodiment)
1000 transmission mechanism (fourth embodiment)

INDUSTRIAL APPLICABILITY

The present invention can be applied to control a hybrid vehicle which is provided with a locking mechanism in which play elimination is required in the locking of a rotational element and which can adopt a plurality of power transmission modes by locking the rotational element.

The invention claimed is:
1. A control apparatus for a hybrid vehicle,
the hybrid vehicle comprising:
power supplying elements including at least a first electric motor, a second electric motor, and an internal combustion engine;
a power transmission mechanism comprising a plurality of rotational elements which can mutually perform differential rotation and which includes a first rotational element coupled with the first electric motor, a second rotational element coupled with the second electric motor, and a third rotational element coupled with the internal combustion engine, the power transmission mechanism performing power transmission between a drive shaft coupled with an axle and the power supplying elements in accordance with a power transmission mode determined in accordance with a state of each of the plurality of rotational elements; and
an engaging mechanism comprising a first engaging element coupled with a locked element as one of the plurality of rotational elements, a second engaging element which is opposed to and can engage with the first engaging element and which is coupled with a fixed element which cannot rotate or a locking element as one rotational element other than the locked element of the plurality of rotational elements, and a driving device capable of driving the first or second engaging element in a direction opposed to the second or first engaging element, respectively, the engaging mechanism capable of changing the state of the locked element between (1) a lock state in which the locked element engages with the locking element and which is realized by eliminating play formed between the first and second engaging elements in their rotational direction to bring the first and second engaging elements into contact in the rotational direction in a situation in which the first and second engaging elements are coupled with the locked element and the locking element and (2) a release state in which the locked element is released from the locking element,
said control apparatus comprising:
a first controlling device for controlling one power supplying element corresponding to the locked element out of the power supplying elements such that the locked element and the locking element are in a rotation synchronous state in response to a locking request to transfer the locked element to the lock state;
a second controlling device for controlling the driving device such that the first or second engaging element is driven in the opposed direction to form the play if the locked element and the locking element are in the rotation synchronous state; and a third controlling device for controlling the one power supplying element such that the first engaging element rotates in a direction of eliminating the formed play in a situation in which the play is formed and such that an impulse when the first engaging element comes into contact with the second engaging element is reduced.

2. The control apparatus for the hybrid vehicle according to claim 1, wherein the engaging mechanism is configured to change a speed change mode for defining a transmission gear ratio, which is a ratio between a rotational speed of the drive shaft and a rotational speed of the internal combustion engine, between a stepless speed change mode in which the transmission gear ratio corresponding to a case where the locked element is in the release state is continuously variable and a fixed speed change mode in which the transmission gear ratio corresponding to a case where the locked element is in the lock state is fixed.

3. The control apparatus for the hybrid vehicle according to claim 1, wherein said third controlling device controls a rotational speed of the one power supplying element in accordance with a remaining amount of the formed play.

4. The control apparatus for the hybrid vehicle according to claim 3, wherein said third controlling device controls the rotational speed of the one power supplying element such that a relative rotational speed between the first engaging element and the second engaging element is reduced in accordance with a reduction in the remaining amount.

5. The control apparatus for the hybrid vehicle according to claim 3, wherein the engaging mechanism is a cam-lock mechanism which includes: a cam as the first engaging element; a clutch element as the second engaging element which is opposed to the cam in a situation in which a predetermined power transmission member is laid between the clutch plate and the cam and which is separated from the locking element in an initial state; and an actuator as the driving device capable of applying to the clutch element a driving force for fixing the clutch element to the locking element, and in which the play corresponding to a movable range of the power transmission member is formed in the rotational direction by that the clutch element is fixed to the locking element in the rotation synchronous state, and said third controlling device controls the rotational speed of the one power supplying element by using an amount of the play at a time at which the clutch element is fixed to the locking element as a reference value of the remaining amount.

6. The control apparatus for the hybrid vehicle according to claim 1, wherein said third controlling device controls a phase of the one power supplying element in accordance with a remaining amount of the formed play.

7. The control apparatus for the hybrid vehicle according to claim 6, wherein the engaging mechanism is a cam-lock mechanism which includes: a cam as the first engaging element; a clutch element as the second engaging element which is opposed to the cam in a situation in which a predetermined power transmission member is laid between the clutch plate and the cam and which is separated from the locking element in an initial state; and an actuator as the driving device capable of applying to the clutch element a driving force for fixing the clutch element to the locking element, and in which the play corresponding to a movable range of the power transmission member is formed in the rotational direction by that the clutch element is fixed to the locking element in the rotation synchronous state, and said third controlling device controls the phase of the one power supplying element by using an amount of the play at a time at which the clutch element is fixed to the locking element as a reference value of the remaining amount.

8. The control apparatus for the hybrid vehicle according to claim 1, further comprising:

a specifying device for specifying a driver request torque as the power to be outputted to the drive shaft; and a fourth controlling device for controlling the power supplying elements such that a torque as the power supplied to the drive shaft at a time at which the locked element transfers from the release state to the lock state is not separated with respect to the specified driver request torque.

* * * * *